(12) United States Patent
He et al.

(10) Patent No.: US 11,968,427 B2
(45) Date of Patent: Apr. 23, 2024

(54) VIDEO MESSAGE GENERATION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Fen He, Shenzhen (CN); Xuejun Sun, Shenzhen (CN); Han Liu, Shenzhen (CN); Liqiang Liu, Shenzhen (CN); Yujun Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/706,945

(22) Filed: Mar. 29, 2022

(65) Prior Publication Data
US 2022/0224983 A1 Jul. 14, 2022

Related U.S. Application Data

(63) Continuation of application No. PCT/CN2020/123653, filed on Oct. 26, 2020.

(30) Foreign Application Priority Data

Jan. 22, 2020 (CN) .......................... 202010075065.8

(51) Int. Cl.
G06F 3/00 (2006.01)
G06F 13/00 (2006.01)
(Continued)

(52) U.S. Cl.
CPC ........... *H04N 21/472* (2013.01); *H04L 51/10* (2013.01); *H04L 51/48* (2022.05);
(Continued)

(58) Field of Classification Search
CPC ......... H04N 21/472; H04N 21/234345; H04N 21/4312; H04N 21/4788; H04N 21/2355;
(Continued)

(56) References Cited

U.S. PATENT DOCUMENTS 5,717,468 A    2/1998  Baryla
2013/0004138 A1*  1/2013  Kilar .................. H04N 21/8455
                                                386/230
(Continued)

FOREIGN PATENT DOCUMENTS

CN    104811765 A    7/2015
CN    105872820 A    8/2016
(Continued)

OTHER PUBLICATIONS

The World Intellectual Property Organization (WIPO) International Search Report for PCT/CN2020/123653 dated Jan. 19, 2021 6 Pages (including translation).
China National Intellectual Property Administration (CNIPA) Office Action 1 for 202010075065.8 dated Jan. 19, 2023 13 Pages (including translation).

*Primary Examiner* — Gigi L Dubasky
(74) *Attorney, Agent, or Firm* — ANOVA LAW GROUP PLLC

(57) ABSTRACT

This application provides a video message generation method and apparatus, an electronic device, and a storage medium. The video message generation method includes: receiving a comment instruction for a video; determining a target frame corresponding to the comment instruction in the video; obtaining input comment content of the target frame; and generating a video message based on the video, the target frame, and the comment content of the target frame.

20 Claims, 20 Drawing Sheets

(51) Int. Cl.
*H04L 51/10* (2022.01)
*H04L 51/48* (2022.01)
*H04N 5/445* (2011.01)
*H04N 21/2343* (2011.01)
*H04N 21/431* (2011.01)
*H04N 21/472* (2011.01)
*H04N 21/4788* (2011.01)

(52) U.S. Cl.
CPC . *H04N 21/234345* (2013.01); *H04N 21/4312* (2013.01); *H04N 21/4788* (2013.01)

(58) Field of Classification Search
CPC ........... H04N 21/4355; H04N 21/4756; H04N 21/4316; H04N 21/440245; H04N 21/4884; H04N 21/8133; H04N 21/8153; H04N 21/8405; H04N 21/482
See application file for complete search history.

(56) References Cited

U.S. PATENT DOCUMENTS

| | | | |
|---|---|---|---|
| 2016/0149956 A1* | 5/2016 | Birnbaum | H04L 63/20 726/1 |
| 2018/0176648 A1* | 6/2018 | Lee | H04N 21/8133 |
| 2018/0176661 A1* | 6/2018 | Varndell | G06F 40/169 |

FOREIGN PATENT DOCUMENTS

| | | | |
|---|---|---|---|
| CN | 106303723 A | | 1/2017 |
| CN | 107635153 A | * | 1/2018 |
| CN | 107635153 A | | 1/2018 |
| CN | 107786905 A | | 3/2018 |
| CN | 107992246 A | | 5/2018 |
| CN | 108055587 A | | 5/2018 |
| CN | 110475134 A | | 11/2019 |
| KR | 20150030387 A | | 3/2015 |

\* cited by examiner ium, storing a
VIDEO MESSAGE GENERATION METHOD AND APPARATUS, ELECTRONIC DEVICE, AND STORAGE MEDIUM

RELATED APPLICATIONS

This application is a continuation application of PCT Application No. PCT/CN2020/123653, filed on Oct. 26, 2020, which in turn claims priority to Chinese Patent Application No. 202010075065.8, entitled "VIDEO MESSAGE GENERATION METHOD AND APPARATUS, ELECTRONIC DEVICE, AND STORAGE MEDIUM" filed on Jan. 22, 2020. The two applications are incorporated by reference in their entirety.

FIELD OF THE TECHNOLOGY

This application relates to the field of video processing technologies, and in particular, to a video message generation method and apparatus, an electronic device, and a storage medium.

BACKGROUND OF THE DISCLOSURE

In a social networking application, a user can not only realize instant messaging with another user, but also share content with another user. For example, the user thinks that a picture in a video is funny, so he shares the video with another user and posts a funny comment. From the perspectives of other users, they can not only view the video shared by the user, but also can view the funny comment posted by the user on the video shared by the user.

However, there are situations in which the sharing content is not accurately expressed and a sharing action of the user cannot be accurately conveyed. For example, the video shared by the user only has a funny moment, but the whole video describes a sad story. When viewing the video shared by the user, other users cannot accurately understand the meaning of the funny comment posted by the user.

SUMMARY

In view of this, embodiments of this application provide a video message generation method and apparatus, an electronic device, and a storage medium, which can accurately express shared content of a video.

The technical solutions used in the embodiments of this application are as follows:

The embodiments of this application provide a video message generation method, including receiving a comment instruction for a video; determining a target frame corresponding to the comment instruction in the video; obtaining input comment content of the target frame; and generating a video message based on the video, the target frame, and the comment content of the target frame.

The embodiments of this application further provide a video message generation apparatus, including a comment instruction receiving module, configured to receive a comment instruction for a video; a target frame determining module, configured to determine a target frame corresponding to the comment instruction in the video; a comment content obtaining module, configured to obtain input comment content of the target frame; and a video message generation module, configured to generate a video message based on the video, the target frame, and the comment content of the target frame.

The embodiments of this application further provide an electronic device, including a processor and a memory, the memory storing computer-readable instructions, the computer-readable instructions, when executed by the processor, implementing the video message generation method provided in the embodiments of this application.

The embodiments of this application further provide a non-transitory computer readable storage medium, storing a computer program, the computer program, when run by a processor, performing the video message generation method provided in the embodiments of this application.

By adopting the embodiments of this application, when a comment instruction for a video is received, so that a target frame corresponding to the comment instruction in the video is determined according to the comment instruction. Comment content inputted for the target frame is obtained, so that a video message is generated based on the video, the target frame, and the comment content of the target frame. Accordingly, a video message that will be shared is not only related to the target frame corresponding to the comment instruction in the video, but also is related to the comment content of the target frame. When viewing the video message shared by the user, another user can understand that the comment content posted by the user is for the target frame, which ensures expression accuracy of the shared content when the video is shared.

DESCRIPTION OF EMBODIMENTS

To describe embodiments in detail herein, examples of the embodiments are shown in the accompanying drawings. When the following descriptions are made with reference to the accompanying drawings, unless otherwise indicated, the same numbers in different accompanying drawings represent the same or similar elements. The implementations described in the following embodiments do not represent all implementations that are consistent with this application. On the contrary, the implementations are merely examples of devices and methods that are described in detail in the appended claims and that are consistent with some aspects of this application.

In a social application, a user can not only realize instant messaging with another user, but also share content with another user. The shared content may be a photo, a song, a video, and the like. However, because entire videos are often shared among users, sharing actions of the users may not be accurately conveyed.

For the above problems, some users may use third-party applications to perform video editing on pictures that they actually need to share, to ensure that comments posted by them are for one or several pictures in a video, thereby realizing accurate conveying of sharing actions of the users.

However, this solution not only requires the users to perform additional video editing on the pictures that they actually need to share through the third-party applications, but also requires the users to master specific steps of the third-party applications for video editing. For many users, if the video editing process is too complex, the fun of video sharing is affected.

In view of this, the embodiments of this application provide a video message generation method, which can accurately express shared content when a video is shared. Correspondingly, the embodiments of this application further provide a video message generation apparatus, deployed on an electronic device. In some embodiments, the electronic device may be a terminal or a server, for example, the electronic device is a smartphone, a desktop computer, a notebook computer, a tablet computer, or the like, to realize the video message generation method.

Figure 1:
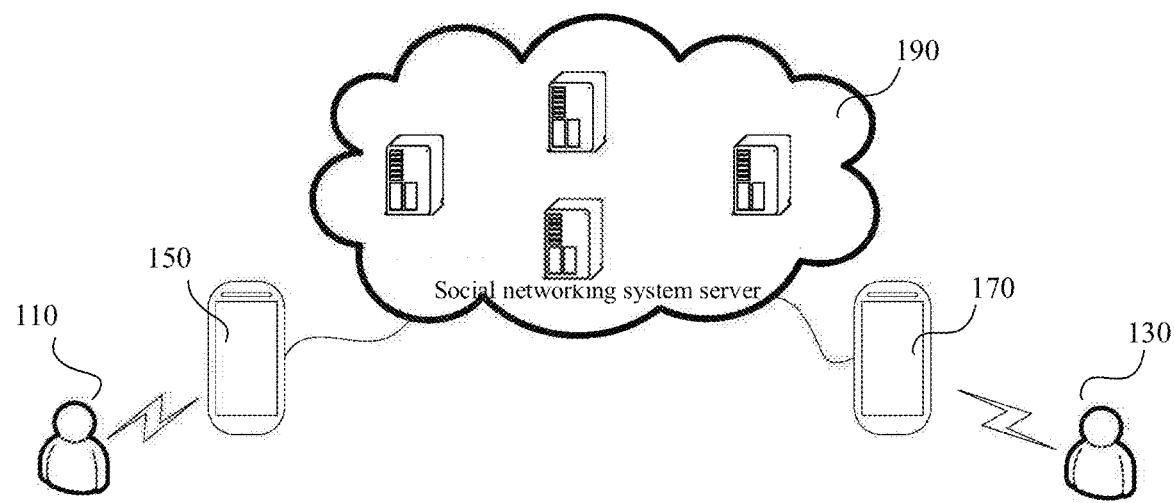
FIG. 1 is a schematic diagram of an implementation environment according to an embodiment of this application.

FIG. 1 is a schematic diagram of an implementation environment of a video message generation method according to an embodiment of this application. The implementation environment includes a user 110, a user 130, an electronic device 150, an electronic device 170, and a social network system server 190.

In some embodiments, the electronic device may run a social application. For example, the electronic device may be a smartphone, a desktop computer, a notebook computer, a tablet computer, or the like, which is not limited herein.

The social network system server 190 may be a social network system server, a server cluster formed by a plurality of social network system servers, or a cloud computing center formed by a plurality of social network system servers. For example, the social network system server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform. The social network system server is an electronic device that provides a social service for a user.

A network connection is established in advance between the electronic device 150 and the electronic device 170 and a social network system server in the social network system server 190 through a network, to realize social network data transmission between the electronic device 150 and the electronic device 170 through the network connection. For example, the transmitted social network data includes, but is not limited to: a video message.

As the electronic device 150 and the electronic device 170 interact with a social network system server in the social network system server 190 through the established network connection and a social application is respectively run on the electronic device 150 and the electronic device 170, screens configured on the electronic device 150 and the electronic device 170 correspondingly represent a social application interface, such as a session interface, thereby realizing instant messaging or video message sharing between the user 110 and the user 130 through the social application interface.

Figure 2:
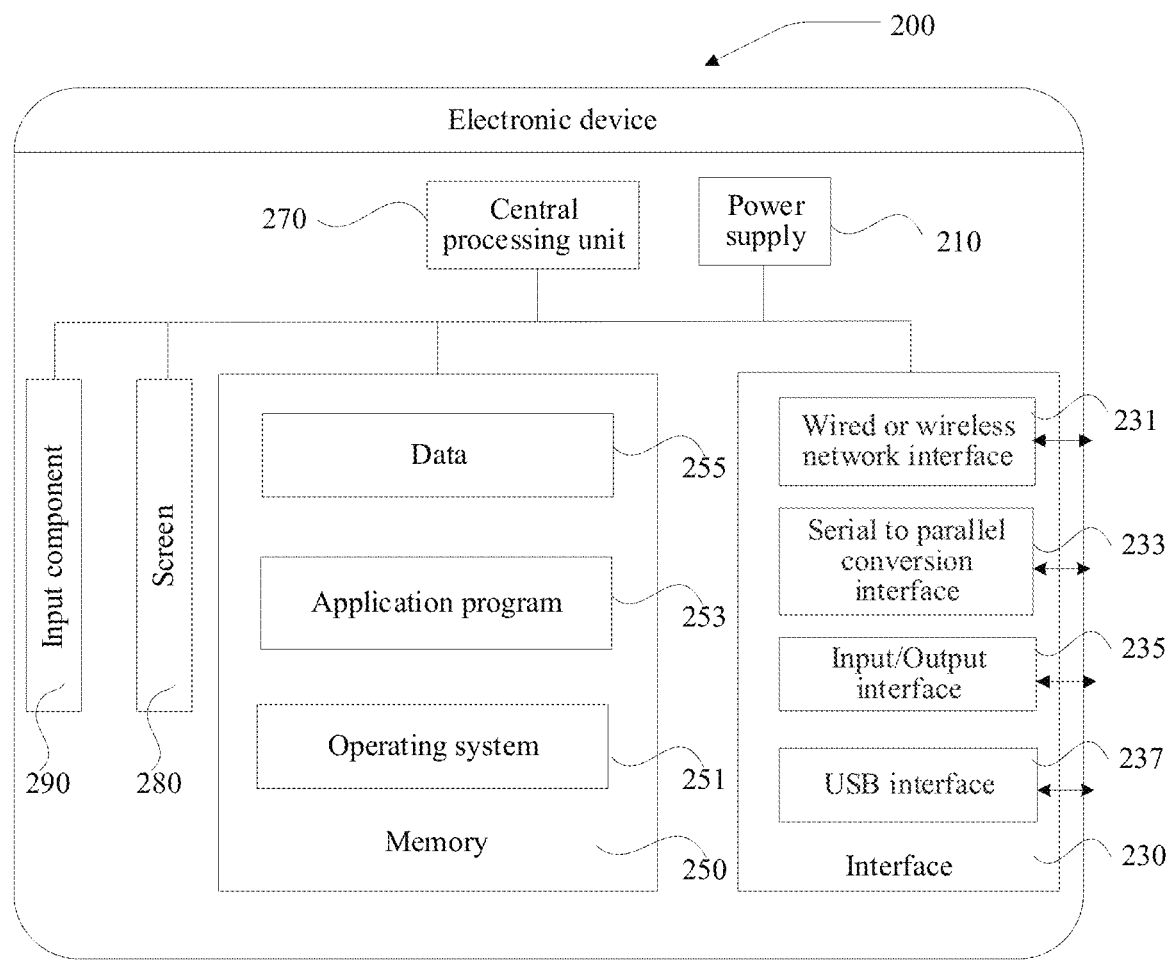
FIG. 2 is a hardware structural diagram of an electronic device according to an embodiment of this application.

FIG. 2 is a hardware structural diagram of an electronic device according to an embodiment. The electronic device is applicable to the electronic device 150 and the electronic device 170 of the implementation environment shown in FIG. 1. For example, the electronic device may be a smartphone, a desktop computer, a notebook computer, a tablet computer, or the like.

The electronic device is merely an example adapted to this application, and cannot be considered as providing any limitation to a use range of this application. The electronic device cannot be explained as needing to reply on or needing to have one or more components in an electronic device 200 shown in FIG. 2.

The hardware structure of the electronic device 200 may have a large difference due to different configurations or performance. As shown in FIG. 2, the electronic device 200 includes: a power supply 210, an interface 230, at least one memory 250, at least one central processing unit (CPU) 270, a screen 280 and an input component 290.

In some embodiments, the power supply 210 is configured to provide a working voltage for each hardware device on the electronic device 200.

The interface 230 includes at least one wired or wireless network interface 231 configured to interact with external devices. For example, the social network data transmission between the electronic device 150 and the electronic device 170 in the implementation environment shown in FIG. 1 is performed.

In other examples adapted to this application, the interface 230 may further include at least one serial to parallel conversion interface 233, at least one input/output interface 235, and at least one USB interface 237. As shown in FIG. 2, this is not specifically limited herein.

The memory 250 as a carrier for resource storage can be a read-only memory, a random access memory, a magnetic disk, an optical disc, or the like. Resources stored on the memory include an operating system 251, an application program 253, and data 255. A storage method can be temporary storage or persistent storage.

The operating system 251 is configured to manage and control the hardware devices and the application program 253 on the electronic device 200, so as to implement operations and processing of the CPU 270 on the massive data 255 in the memory 250, and may be Windows Server™, Mac OS X™, Unix™, Linux™, FreeBSD™, or the like.

The application program 253 is a computer program that completes at least one specific task based on the operating system 251, and may include at least one module (not shown in FIG. 2), and each module may include a series of computer-readable instructions to the electronic device 200. For example, a social application deployed with a video message generation apparatus is regarded as the application program 253 which may be run on the electronic device 200.

The data 255 may be photos, pictures, videos, and the like stored in the magnetic disk, or may be video messages, and the like stored in the memory 250.

The CPU 270 may include one or more processors, and is configured to communicate with the memory 250 by using at least one communication bus, to read computer-readable instructions stored in the memory 250, thereby implementing the operations and processing on the massive data 255 in the memory 250. For example, the video message generation method is completed in the form of reading a series of computer-readable instructions stored in the memory 250 by using the CPU 270.

The screen 280 may be a liquid crystal display screen, an electronic ink display screen, or the like. The screen 280 provides an output interface between the electronic device 200 and a user to display, through the output interface, output content formed by any form of text, a picture, or a video, or a combination thereof to the user. For example, the output interface may be a social application interface in the electronic device 200 or a video playing interface for video playing.

The input component 290 may be a touch layer covering the screen 280, or may be a key, a trackball, or a touchpad disposed on a housing of the electronic device 200 or may be an external keyboard, a mouse, a touchpad, or the like, and is configured to obtain various operations triggered by a user, for example, a picture commenting operation triggered by a user on a video played in a video playing interface.

In addition, this application may also be implemented by means of a hardware circuit or a hardware circuit combined with a software instruction. Therefore, implementations of this application are not limited to any specific hardware circuit, software or a combination of two.

Figure 3:
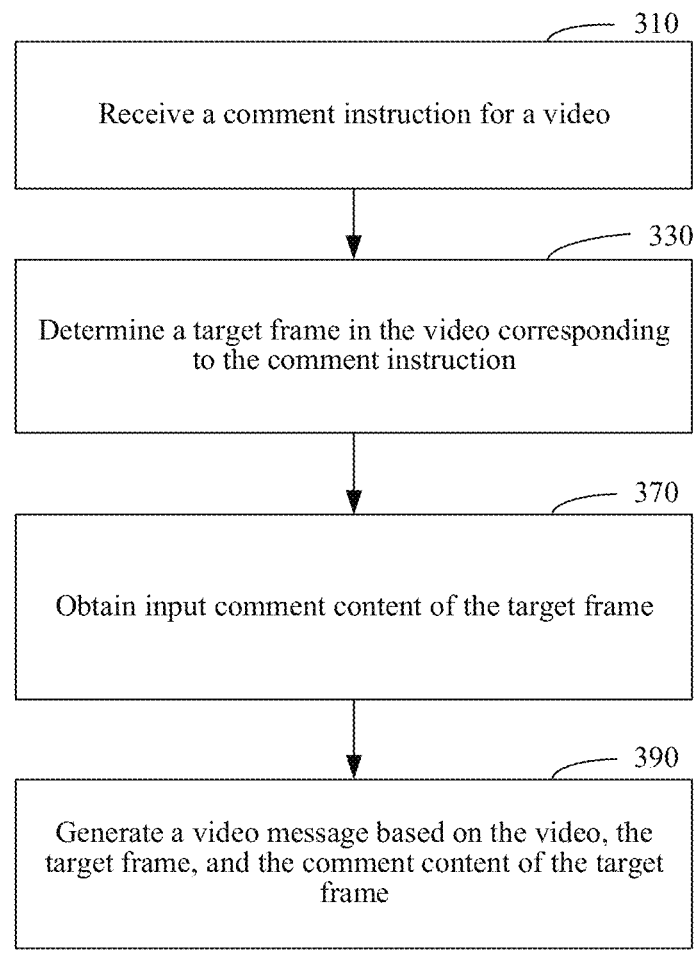
FIG. 3 is a flowchart of a video message generation method according to an embodiment of this application.

Referring to FIG. 3, in an embodiment, a video message generation method is applicable to the electronic device in the implementation environment shown in FIG. 1. A structure of the electronic device may be as shown in FIG. 2.

The video message generation method may be performed by an electronic device, or may be understood as being performed by an application program (a social application deployed with a video message generation apparatus) run on an electronic device. In the following method embodiments, for ease of description, an execution body of each step is described as the electronic device, which is not limited herein.

The video message generation method may include the following steps:

Step 310: Receive a comment instruction for a video.

As mentioned above, if a user thinks that a picture in a video is funny, it is possible that the user intends to share the video with another user and posts a funny comment.

The video herein refers a video that a user intends to share with another user and includes a long video and a short video. Correspondingly, the comment instruction is used for prompting that a user of an electronic device posts a relevant comment on the video that the user shares.

The comment instruction may be received in a video application or a social application. For example, the social application is an instant messaging application.

For example, as the video application is run on the electronic device, a video playing interface is correspondingly displayed on a screen configured on the electronic device, and the user may watch the video through the video playing interface.

In this case, the comment instruction for the video may be received in the video application.

Figure 4:
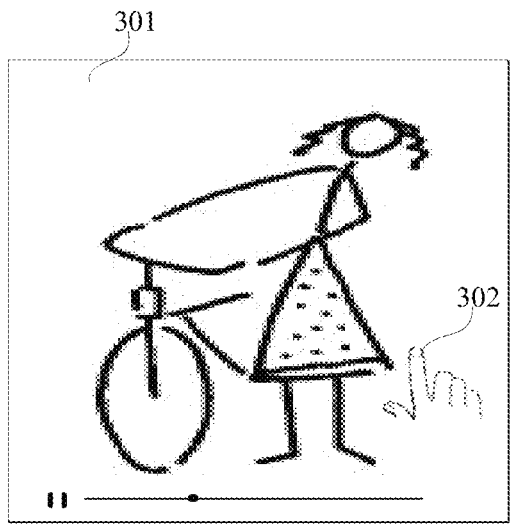
FIG. 4 to FIG. 5 are schematic diagrams of a comment instruction according to an embodiment of this application.

In some embodiments, as shown in FIG. 4, in a video playing interface 301 in which the video is played, a picture commenting operation 302 triggered by the user on the video played in the video playing interface 301 is detected; and the detected picture commenting operation 302 is used as the comment instruction.

Alternatively, as the instant messaging application is run on the electronic device, a session interface is correspondingly displayed on the screen configured on the electronic device, and the user may realize instant messaging with another user through the session interface. During instant messaging, the user may send a session message to the session interface, and another user may view the session message, and reply a new session message for the session message.

The session message may include text, a picture, an emoticon, any combination of text, a picture, or an emoticon, or a video. In some embodiments, the session message may alternatively be considered as citation of text, a picture, an emoticon, and a video. Therefore, according to quoted content in the session message, the session message may be divided into different types of session messages, and at least includes a text-type session message, a picture-type session message, an emoticon-type session message, a graphic-text session message, and a video-type session message. In the embodiments of this application, a session message citing a video cites a complete video.

Therefore, based on the session message citing the video displayed in the session interface, the comment instruction for the video may be received in the instant messaging application.

Figure 5:
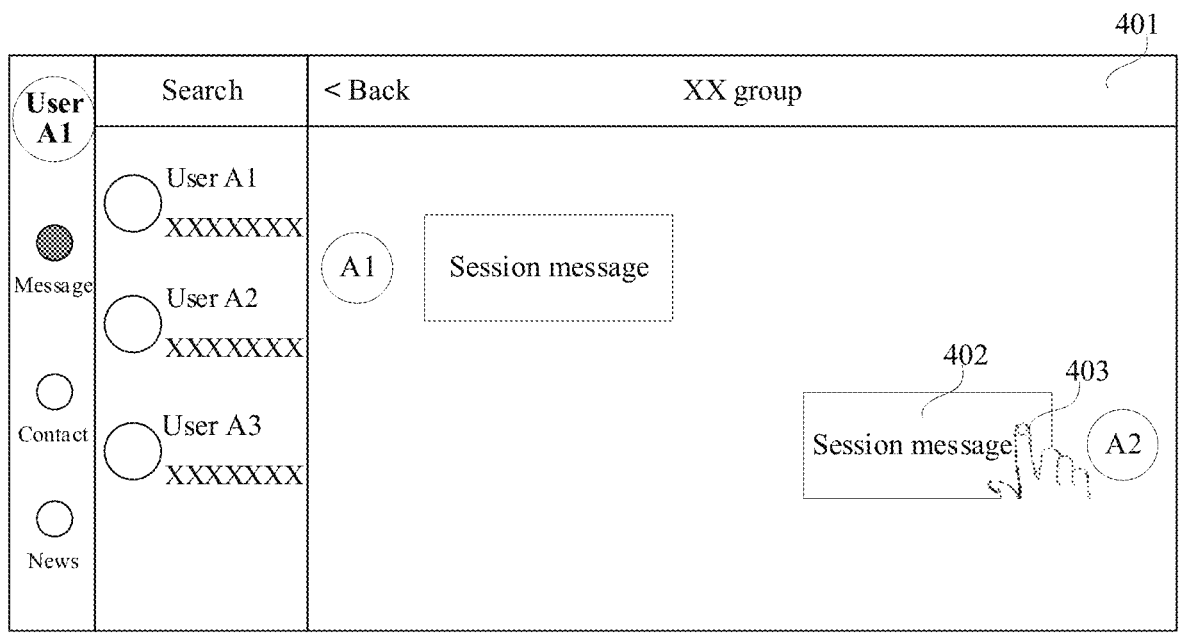

In some embodiments, as shown in FIG. 5, in a process that a session interface 401 displays a session message 402 citing the video, a video viewing operation 403 triggered by the user on the session message 402 is detected. When the video viewing operation 403 is detected, a jump is made from the session interface 401 to the video playing interface 301. As shown in FIG. 4, the video is played.

In this case, similar to the comment instruction for the video being received in the video application, after the jump is made from the session interface 401 to the video playing interface 301, the picture commenting operation 302 triggered by the user for the video played in the video playing interface 301 is detected as the comment instruction.

For ease of description, the video playing interface 301 is not differentiated to belong to the video application or the social application, but is a user interface used for playing a video in a screen configured in an electronic device.

In the embodiments of this application, regardless of whether an operation is a picture commenting operation, a video viewing operation, or an other operation triggered by the user, the operation is triggered for implementation through an operation portal (also considered as a control) provided on the user interface displayed on the screen configured in the electronic device.

For example, as shown in FIG. 5, in the session interface 401, a message click entry corresponding to the session message 402 is provided. If the user intends to view the video cited by the session message 402, the user may click the message click entry, so that the user interface displayed in the screen configured on the electronic device is jumped from the session interface 401 to the video playing interface 301. Accordingly, as shown in FIG. 4, the video is played in the video playing interface 301. A click operation of the user on the message click entry is regarded as the video viewing operation 403 triggered by the user on the session message 402.

In addition, according to the different input components configured in the electronic device, regardless of whether an operation is a picture commenting operation, a video viewing operation, or an other operation triggered by the user, a specific action thereof may alternatively be different, and is not limited to gesture operations such as touching, clicking, long-press, and sliding inputted via a touch layer of a smartphone. As shown in FIG. 4 to FIG. 5, the operation may alternatively be a mechanical operation such as dragging, clicking, or double-clicking inputted via a mouse configured on a desktop computer. This is not specifically limited in this embodiment. In other embodiments, the operation may alternatively be performed by means of a touch control.

Step 330: Determine a target frame corresponding to the comment instruction in the video in response to the comment instruction.

First, because entire videos are often shared among users, sharing actions of the users may not be accurately conveyed. If video editing is performed on pictures that the users actually need to share through relying on third-party applications, it is possible that the video editing process is so complex that the fun of video sharing of the users is reduced.

Therefore, to avoid relying on video editing of the third-party applications, in an embodiment, in response to the comment instruction, a plurality of frames of picture of the video are automatically displayed to the user, to help to subsequently determination determinate of the target frame corresponding to the comment instruction.

In some embodiments, a plurality of frames of picture of the video are displayed in a designated region of the video playing interface during playing of the video in the video playing interface, and the plurality of frames of picture includes the target frame.

A video is formed by several frames of static picture, and entire content of the video is expressed through video image information described in each frame of picture. Video image information described in a key frame is used for expressing key content of the video. Compared with the key frame, a picture located between two adjacent key frames is regarded as a transition frame or an in-between frame, and video image information described in the transition frame makes transition of the key content of the video expressed by the two adjacent key frames more continuous and natural.

For example, in a video with hero fighting as a theme, a picture in which a key fighting action in a process of hero fighting is located is regarded as the key frame, and expresses key content of the video, namely, the hero fighting picture. A picture located between two adjacent key frames in which two adjacent key fighting actions are located is regarded as the transition frame or the in-between frame, whose purpose is to make the two adjacent key fighting actions more coherent. It is also believed that essence of the expression is repeated hero fighting pictures, which may be regarded as non-key content of the video.

Therefore, the plurality of frames of the video displayed to the user may refer to all or any few frames of picture of the video, and may alternatively refer to all or any few key frames of picture of the video, which are not limited herein.

An extraction process of key frames is exemplarily described based on content analysis.

For a video, in terms of content, the video is usually shot in a limited number of different scenes (for example, school, and hospital). Therefore, a video shot in the same scene is formed by several frames of picture that are continuous in time and have a highest correlation in content. In other words, frames of picture belonging to the same scene often have a higher correlation. Therefore, extraction of key frames essentially refers to selecting several frames of picture that are most unrelated as the key frames of the video.

The extraction process of key frames may alternatively be performed based on a format of a shot, motion analysis, clustering, compressed video stream extraction, or the like, which is not specifically limited in this embodiment.

In some embodiments, the plurality of frames of picture may be displayed in the entire video playing interface or the designated region of the video playing interface.

If the plurality of frames of picture of video are directly displayed with video format data, a data processing amount may be greatly increased for an electronic device, thereby reducing the processing efficiency. Accordingly, video sharing experience of the user is inevitably affected. For example, frozen picture display, frozen video playback, or the like may be caused.

Therefore, in an embodiment, displaying the plurality of frames of picture of video in the video playing interface essentially refers to displaying thumbnails corresponding to the plurality of frames of picture in the video playing interface.

In some embodiments, thumbnail display is performed in the entire video playing interface.

Figure 6:
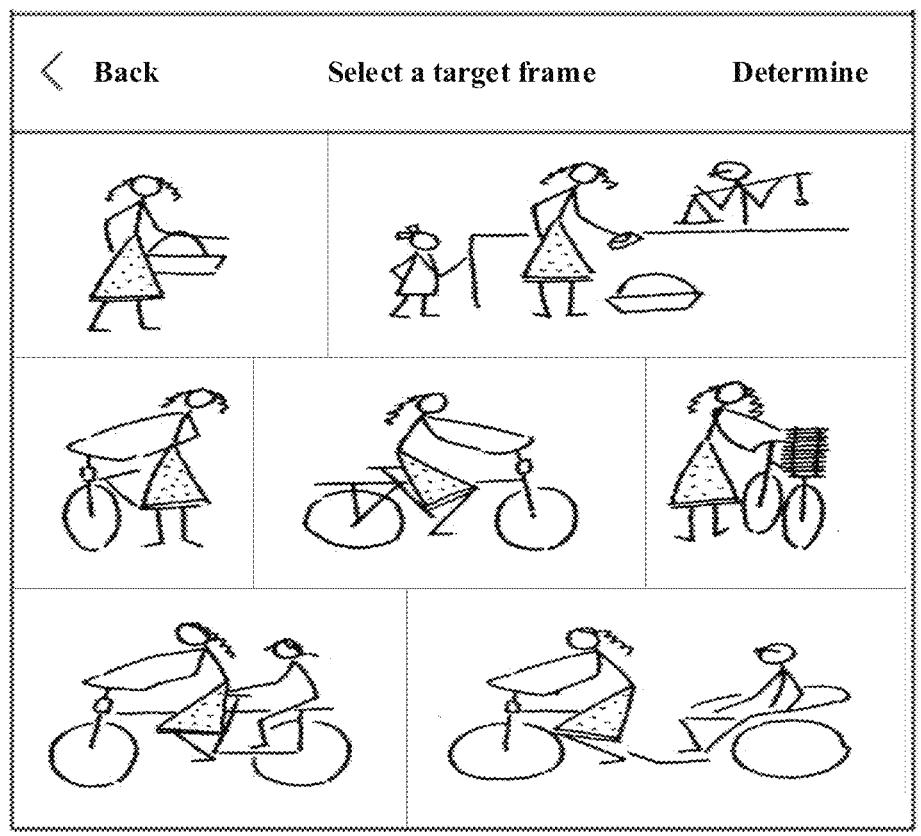
FIG. 6 is a schematic diagram of display of a plurality of pictures according to an embodiment of this application.

As shown in FIG. 6, assuming that the video includes seven frames of picture, the entire video playing interface displays the seven frames of picture of the video in a form of thumbnail listing.

In some embodiments, the thumbnail display is performed in the designated region of the entire video playing interface.

Figure 7:
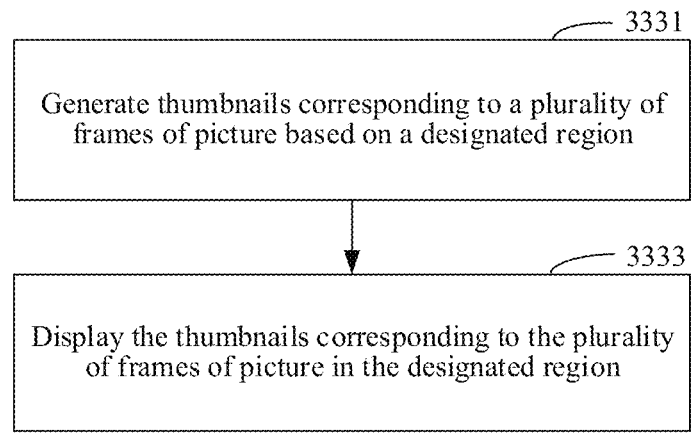
FIG. 7 is a flowchart of a method of thumbnail display according to an embodiment of this application.

Specifically, as shown in FIG. 7, a process that the thumbnail display is performed in the designated region of the entire video playing interface may include the following steps:

Step 3331: Generate thumbnails corresponding to a plurality of frames of picture based on a designated region.

The designated region refers to a part of a display region in a video playing interface.

Figure 8:
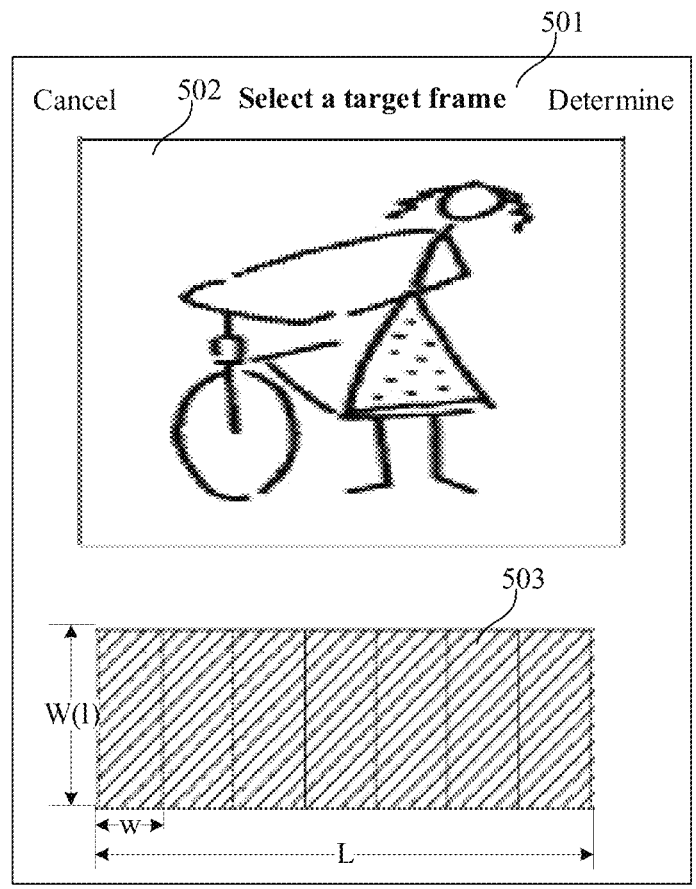
FIG. 8 is another schematic diagram of display of a plurality of pictures according to an embodiment of this application.

As shown in FIG. 8, in a video playing interface 501, a display region of an upper half is a video playing region 502, and a display region of a lower half is a designated region 503 for thumbnail display. In such configuration, the thumbnail display and video playback do not affect each other. When watching the video, the user may determine a target frame through displayed thumbnails, thereby effectively improving the video sharing experience of the user.

Division of the designated region is not limited to upper-lower division, and may alternatively be left-right division, and even the designated region for the thumbnail display is partially or completely superimposed on the video playing region for the video playback, and the like. This is not specifically limited herein.

Referring to FIG. 8 again, a quantity of thumbnails displayed in the designated region 503 is the same as that of thumbnails corresponding to seven frames of picture in the video. For the designated region 503 with the same size, if a greater quantity of thumbnails is intended to be displayed, a size of the thumbnails shall be reduced correspondingly.

It can be learned that the quantity of thumbnails that can be displayed in the designated region is related to the size of the designated region. That is, for each thumbnail displayed in the designated region, a length 1 of the thumbnail is a width W of the designated region, and a width w of the thumbnail is related to a length L of the designated region and the quantity of thumbnails displayed in the designated region 503, as shown in FIG. 8. The width w of the thumbnail is uniquely represented by a quantity of pixels.

Therefore, the thumbnails corresponding to the plurality of frames of picture may be generated according to the designated region.

In some embodiments, a size of a thumbnail corresponding to each frame of picture is fixed, that is, a product of a width of the thumbnail and a designated quantity of thumbnails displayed in the designated region is the length of the designated region, and a length of the thumbnail is the width of the designated region. The designated quantity may be flexibly adjusted according to an actual requirement of an application scenario, which is not limited herein.

In some embodiments, the size of the thumbnail corresponding to each frame of picture is variable, that is, the quantity of thumbnails displayed in the designated region changes as a quantity of frames of picture contained in the video changes. Therefore, a product of the width of the thumbnail and the quantity of frames of picture is the length of the designated region, and the length of the thumbnail is the width of the designated region. That is, a maximum quantity of thumbnails displayed in the designated region is the quantity of frames of picture contained in the video.

In some embodiments, generation of thumbnails is performed by an encoder configured in the electronic device. In some embodiments, the encoder outputs the pictures as data of a YUV format, and then converts the data of the YUV format into thumbnails of a picture format.

Step 3333: Display the thumbnails corresponding to the plurality of frames of picture in the designated region.

As mentioned above, the size of the thumbnail corresponding to the picture may be fixed or variable.

Therefore, for the thumbnail with the fixed-size, the designated quantity of thumbnails is displayed in the designated region. Through display of the designated quantity of thumbnails, the user may more clearly view the plurality of frames of picture of the video, thereby more accurately determining the target frame corresponding to the comment instruction.

For the thumbnail with the variable-size, the maximum quantity of thumbnails is displayed in the designated region, and the maximum quantity is the same as the quantity of frames of picture contained in the video. In this case, through display of the maximum quantity of thumbnails, the user may view the plurality of frames of picture contained in the video without triggering any other operation, thereby determining the target frame corresponding to the comment instruction at a time.

In the process that the video playing interface displays the at least two frames of pictures, the video is played in the video playing interface, and a playing progress bar of the video is displayed.

In this case, the target frame corresponding to the comment instruction may refer to a picture currently played in the video playing interface, may be selected by the user from the displayed plurality of frames of picture, or may be a corresponding picture that the user selects from the video through controlling the playing progress bar of the video.

A process of determining the target frame corresponding to the comment instruction is described below in detail.

In an embodiment, the target frame corresponding to the comment instruction is selected from the displayed plurality of frames of picture.

Figure 9:
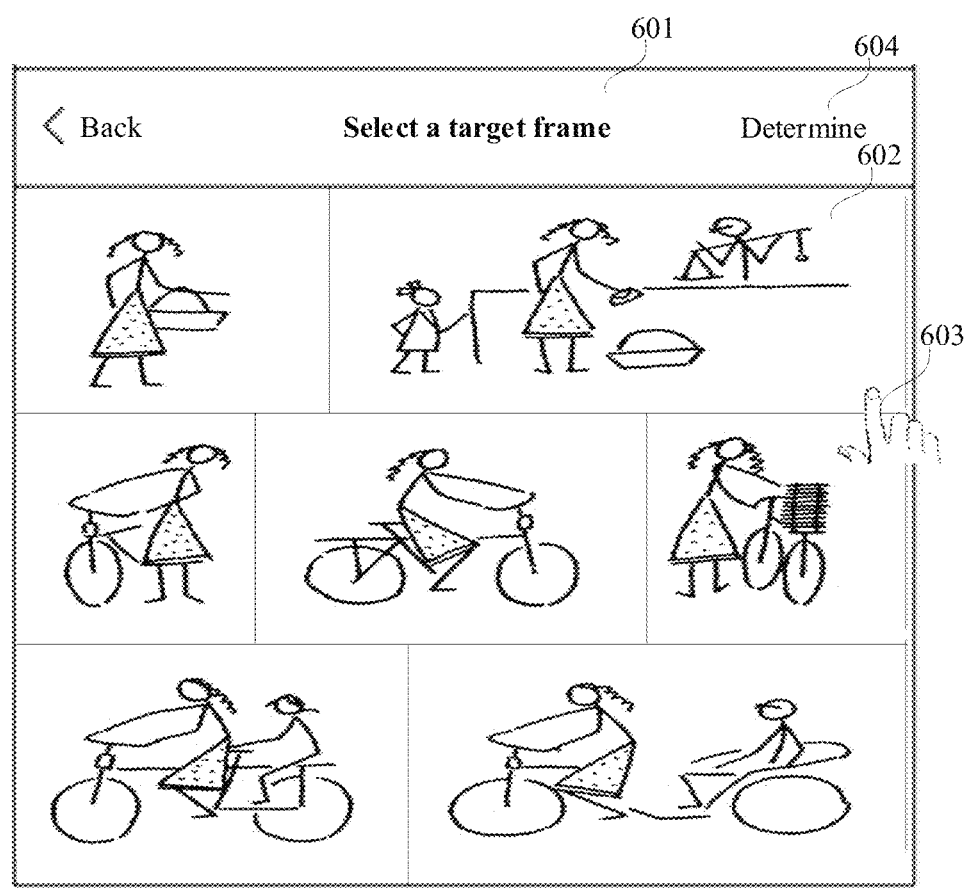
FIG. 9 to FIG. 11 are schematic diagrams of target frame selection according to an embodiment of this application.

For example, as shown in FIG. 9, in a process that thumbnails corresponding to the plurality of frames of picture of the video are displayed in a video playing interface 601, a selection operation 603 triggered by the user on a displayed thumbnail 602 is detected; and a picture corresponding to at least one thumbnail triggered by the detected selection operation 603 is used as the target frame.

In this case, if the user clicks a "determine" icon 604, a picture corresponding to the thumbnail 602 is regarded as the target frame selected by the user from the displayed plurality of frames of picture.

Figure 10:
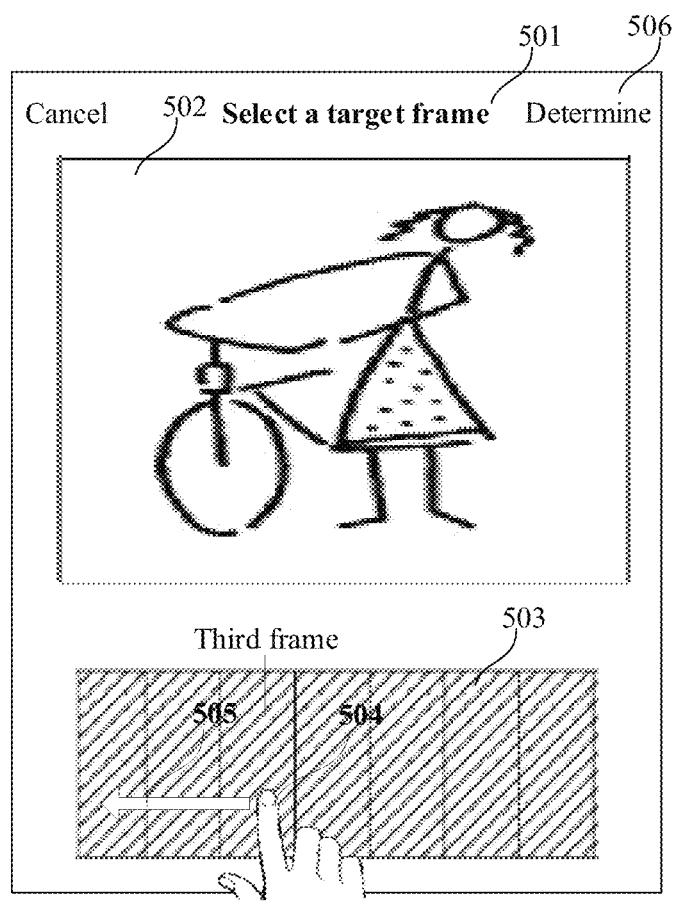

Alternatively, as shown in FIG. 10, in a process that the thumbnails corresponding to the plurality of frames of picture of the video are displayed in a designated region 503 of a video playing interface 501, a selection operation 504 triggered by the user on a displayed third thumbnail is detected; and a picture corresponding to at least one thumbnail triggered by the detected selection operation 504 is used as the target frame.

As mentioned above, if the maximum quantity of thumbnails is displayed in the designated region 503, the user may determine the target frame corresponding to the comment instruction at a time. In this case, if the user clicks a "determine" icon 506, a picture corresponding to the third thumbnail is regarded as the target frame selected by the user from the displayed plurality of frames of picture.

However, if the designated quantity of thumbnails is displayed in the designated region 503, it is possible that the thumbnails corresponding to the plurality of frames of picture are not displayed in the designated region 503 at a time. Assuming that pictures corresponding to the designated quantity of thumbnails in the designated region 503 are not actually required to be shared by the user, an other designated quantity of thumbnails needs to be displayed in the designated region 503, so that pictures corresponding to the other designated quantity of thumbnails are used for re-selection of the user.

In some embodiments, a drag instruction is received, and a designated quantity of thumbnails is extracted from the thumbnails corresponding to the plurality of frames of picture according to the drag instruction. The extracted thumbnails replace thumbnails displayed in the designated region, and are displayed in the designated region.

Figure 11:
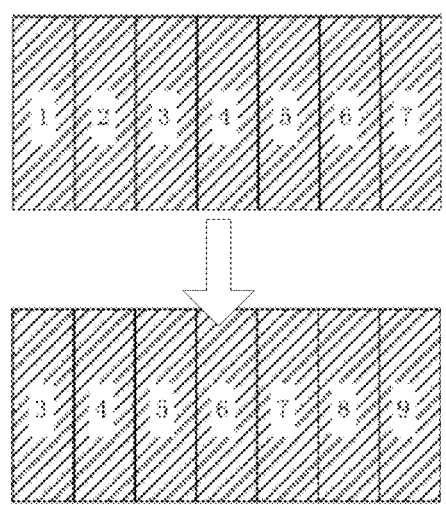

As shown in FIG. 10, in the designated region 503, a detected drag operation 505 performed by the user for the third thumbnail is regarded as the drag instruction, and the drag instruction is used for indicating that the user of the electronic device intends to perform re-selection of thumbnails. Accordingly, the electronic device re-extracts thumbnails corresponding to seven frames of picture (a third frame of picture to a ninth frame of picture) from the thumbnails corresponding to the plurality of frames of picture, and replaces the thumbnails (corresponding to a first frame of picture to a seventh frame of picture) displayed in the designated region 503 for display, as shown in FIG. 11.

In this case, the user may perform re-selection on the third frame of picture to the ninth frame of picture corresponding to the thumbnails displayed in the designated region. When the user clicks the "determine" icon 506, it is regarded that the user has selected the target frame from the displayed frames of picture.

In another embodiment, the target frame corresponding to the comment instruction is a corresponding picture that the user selects from the video through controlling the playing progress bar of the video.

In this case, the video playing interface includes the video playing region used for video playback and the designated region for display of the plurality of frames of picture, so that the video may also be played in the video playing region while the plurality of frames of picture are displayed in the designated region. The playing progress bar of the video is also displayed on the played video in the video playing region.

Therefore, in some embodiments, a control operation triggered by the user on the playing progress bar is detected, and a picture indicated by the control operation is used as the target frame.

In some embodiments, for selection of the target frame, the user may only select a target frame, which indicates that the user actually needs to share a specified frame of picture in the video, and may alternatively select a plurality of target frames, which indicates that the user actually needs to share a video clip including a plurality of frames of picture that are consecutive in time or a plurality of frames of picture that are nonconsecutive and independent in time. This is not limited herein.

Step 370: Obtain input comment content of the target frame.

After the target frame corresponding to the comment instruction is determined, the user may post the comment content for the target frame.

Figure 12:
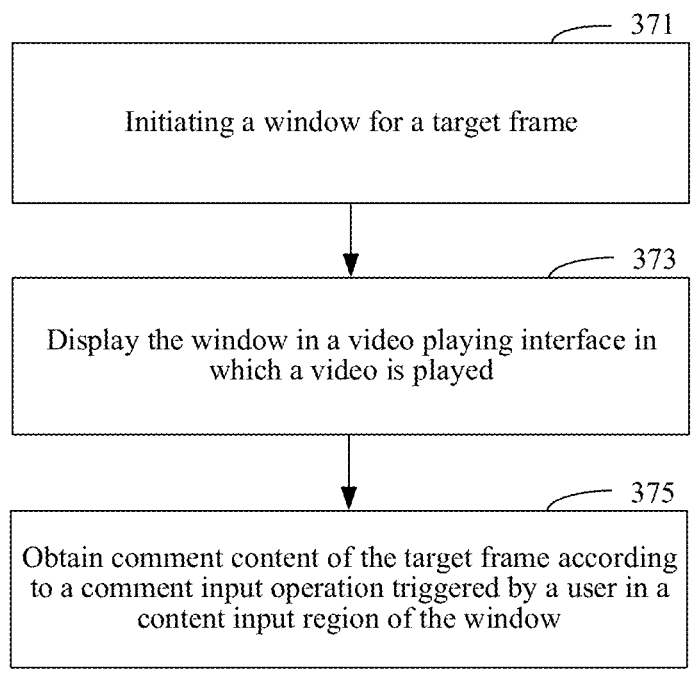
FIG. 12 is a flowchart of an embodiment of step 370 in the embodiment corresponding to FIG. 3.

As shown in FIG. 12, in an implementation of an embodiment, step 370 may include the following steps:

Step 371: Perform window calling for the target frame.

Step 373: Display a called window in the video playing interface in which the video is played.

Step 375: Obtain the comment content of the target frame according to a comment input operation triggered by the user in a content input region of the window.

The window may be a temporarily-created window only used for posting of the comment content for the target frame this time, or may be a window inherent in a social application, for example, a session window belonging to an instant messaging application, and the session window may not only be used for posting of the comment content for the target frame, but also may realize instant messaging among users.

In addition, the window may be displayed in any user interface displayed in the screen configured on the electronic device, and a display format thereof includes, but is not limited to, full-screen display, half-screen display, and the like. Any user interface being the video playing interface is used as an example for description herein.

For example, the window is displayed in the video playing interface in half-screen.

Figure 13:
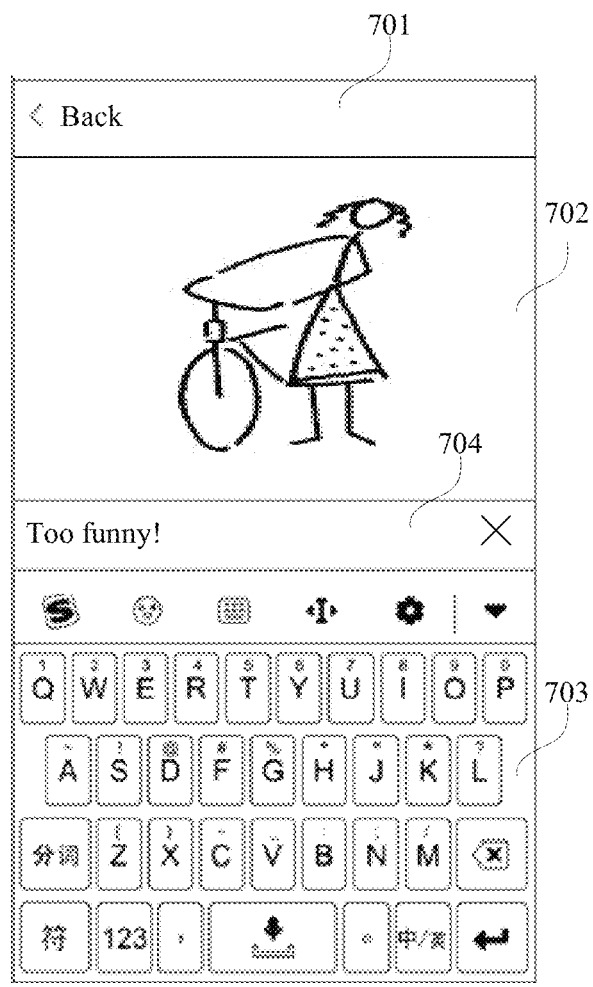
FIG. 13 to FIG. 14 are schematic diagrams of posting comment content according to an embodiment of this application.

As shown in FIG. 13, in a video playing interface 701, a window 703 is displayed in half-screen, that is, a target frame 702 is displayed in an upper half of a screen, and the window 703 called for the target frame 702 is displayed in a lowed half of the screen. According to a comment input operation triggered by the user in a content input region 704 of the window 703, comment content "too funny!" of the target frame 702 is obtained.

Herein, the window 703 is a temporarily-created window only called for posting of the comment content for the target frame this time.

For another example, the window is a session window, and the session window is displayed in the video playing interface in full-screen.

In an implementation of an embodiment, step 371 may include the following steps: Determine a target chat object, to call a session window corresponding to the target chat object for the target frame.

The target chat object refers to another user whom the user intends to share the target frame and the comment content thereof with.

In an aspect, assuming that a user A1 is watching a specified video and the user A1 is used as a group member of a XX group and has established a session with group members of the XX group, all of the group members of the XX group may be regarded as chat objects who have established a session with the user A1. For example, the chat objects include other group members in the XX group: a user A2, and a user A3. Alternatively, the XX group is a chat object of the user A1.

In this case, if the user A1 intends to share a video with the XX group and post comment content for a picture that the user A1 actually needs to share, the user A1 may select the XX group as a target chat object from all chat objects that have currently established a session with the user A1, and call a session window corresponding to the target chat object (the XX group).

Figure 14:
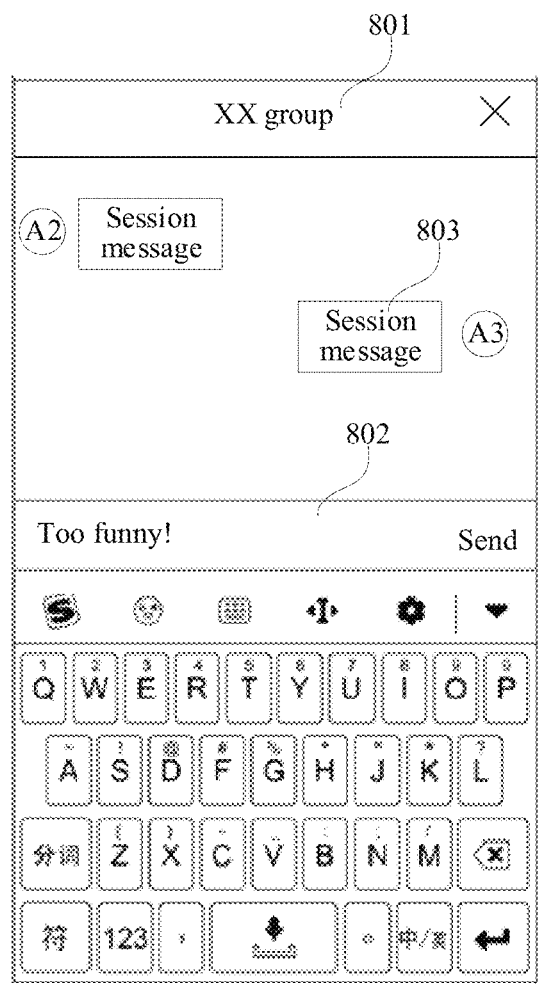

In another aspect, it is assumed that the video is from citation of a session message 803, as shown in FIG. 14, that is, the video is essentially shared by a group member, namely, the user A3, in the XX group to all group members in the XX group, which include, but are not limited to, the user A1.

Then, when the user A1 shares the target frame and the comment content thereof, it is equivalent to replying to the user A3 in the XX group. In this case, for determination of the target chat object, the XX group in which the user A3 who sent the session message 803 citing the video is located is determined as the target chat object, and then the session window corresponding to the target chat object (the XX group) is called.

The chat object is not limited to group members of a group, and may alternatively be an individual. For example, if a session is established between the user A1 and the user A2, user A1 and the user A2 regard each other as chat objects. Based on the established session between the user A1 and the user A2, the two parties may share the target frame and the comment content thereof through corresponding session windows.

As shown in FIG. 14, in a video playing interface, a session window 801 corresponding to the target chat object (the XX group) is displayed in full-screen. According to a comment input operation triggered by the user A1 in a content input region 802 of the session window 801, comment content "too funny!" of the target frame is obtained.

Herein, the session window 801 is a fixed window in the instant messaging application, which may not only realize instant messaging between the group members in the XX group, but also may be used for posting of the comment content for the target frame.

Accordingly, the window-based comment content acquisition is realized.

Step 390: Generate a video message based on the video, the target frame, and the comment content of the target frame.

Herein, the video message essentially cites the target frame and the comment content thereof. Therefore, to ensure that other users may view the target frame and the comment content thereof cited by the video message, the video message is shared to a social application interface, so that a sharing action of the user is accurately conveyed. The video message is displayed in the social application interface.

Figure 15:
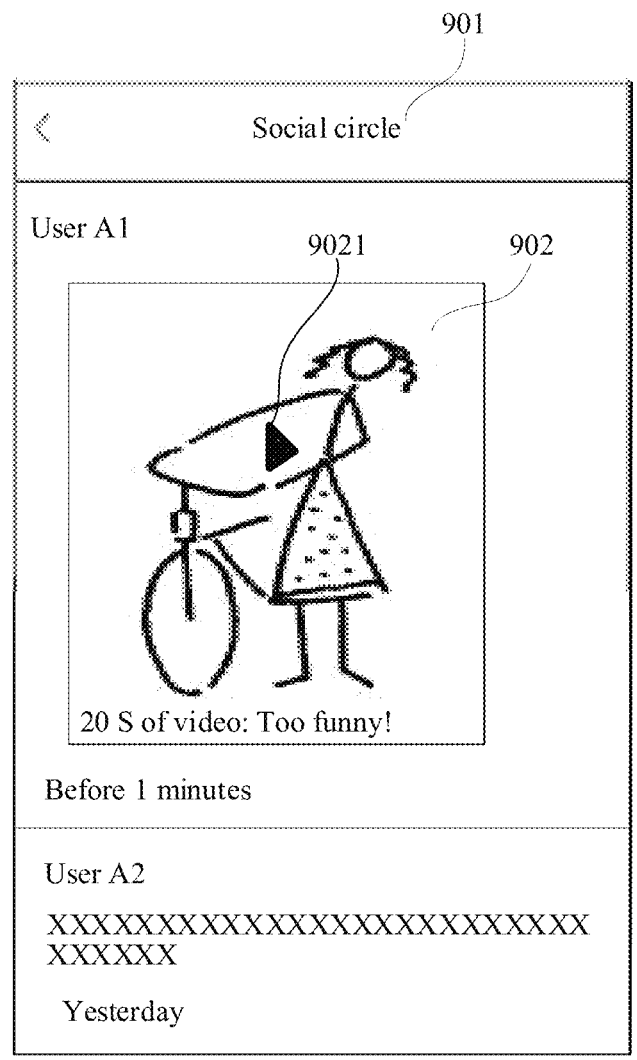
FIG. 15 to FIG. 17 are schematic diagrams of sharing a video message according to an embodiment of this application.

In some embodiments, as shown in FIG. 15, a video message 902 citing the target frame and the comment content thereof is shared to a social application interface 901. In some embodiments, the target frame and the comment content "too funny!" is displayed in the social application interface 901.

In some embodiments, the video message is shared to a session interface of a social application, and the video message includes the video, the target frame, and the comment content of the target frame.

As mentioned above, the video may be a video watched by the user, or a video shared by a user who established a session with the user. Correspondingly, the target chat object may be selected and determined from all chat objects that have currently established a session with the user, or may be determined by a chat object who sent a session message citing the video and established a conversation with the user.

For example, the target chat object is selected from all chat objects that have currently established a session with the user A1.

Figure 16:
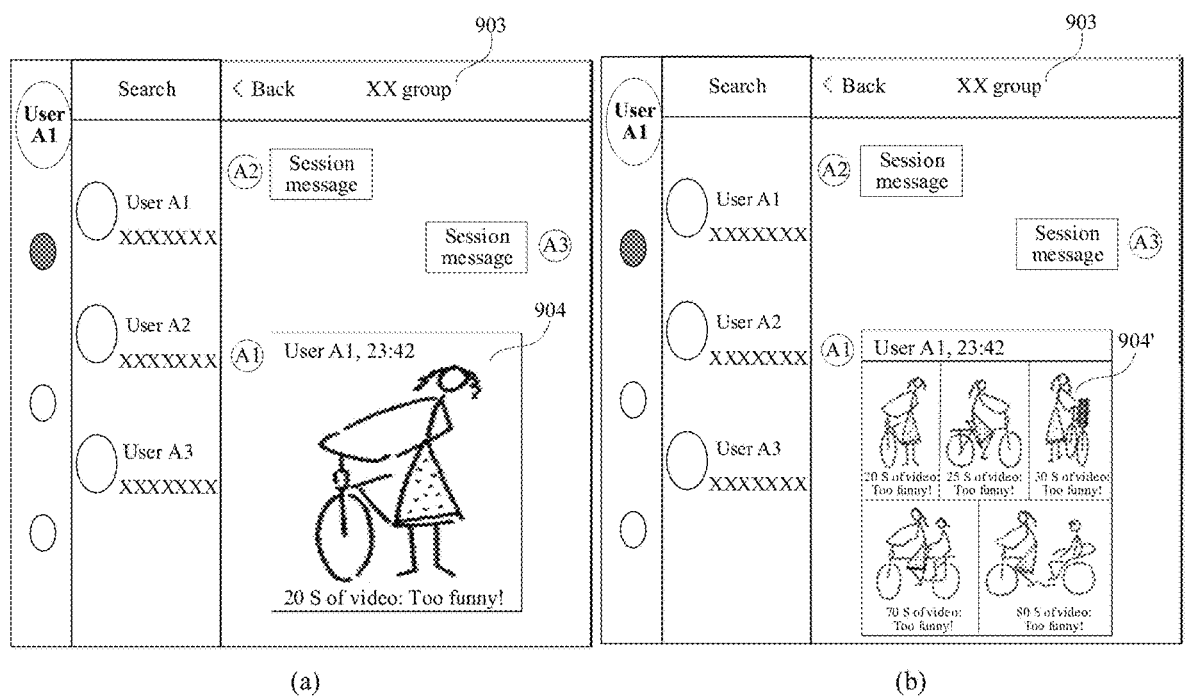

As shown in FIG. 16(*a*), for a target frame, in a session interface 903 in which the target chat object (the XX group) is located, comment content "too funny!" of the target frame and a thumbnail 904 corresponding to the target frame are displayed.

For the thumbnail corresponding to the target frame, assuming that the user clicks the thumbnail and the thumbnail is only amplified for display, the video may be played only when the user clicks the amplified thumbnail again. As shown in FIG. 16(*b*), in the session interface 903 in which the target chat object (the XX group) is located, for a target frame, comment content of a plurality of target frames and thumbnails 904' corresponding to the target frames are displayed in a manner of concatenation.

Similarly, for the plurality of target frames, the user clicks twice one of the target frames, so that the video may be played.

For another example, the target chat object is determined by the chat object who sent a session message citing the video and established a conversation with the user A1.

Figure 17:
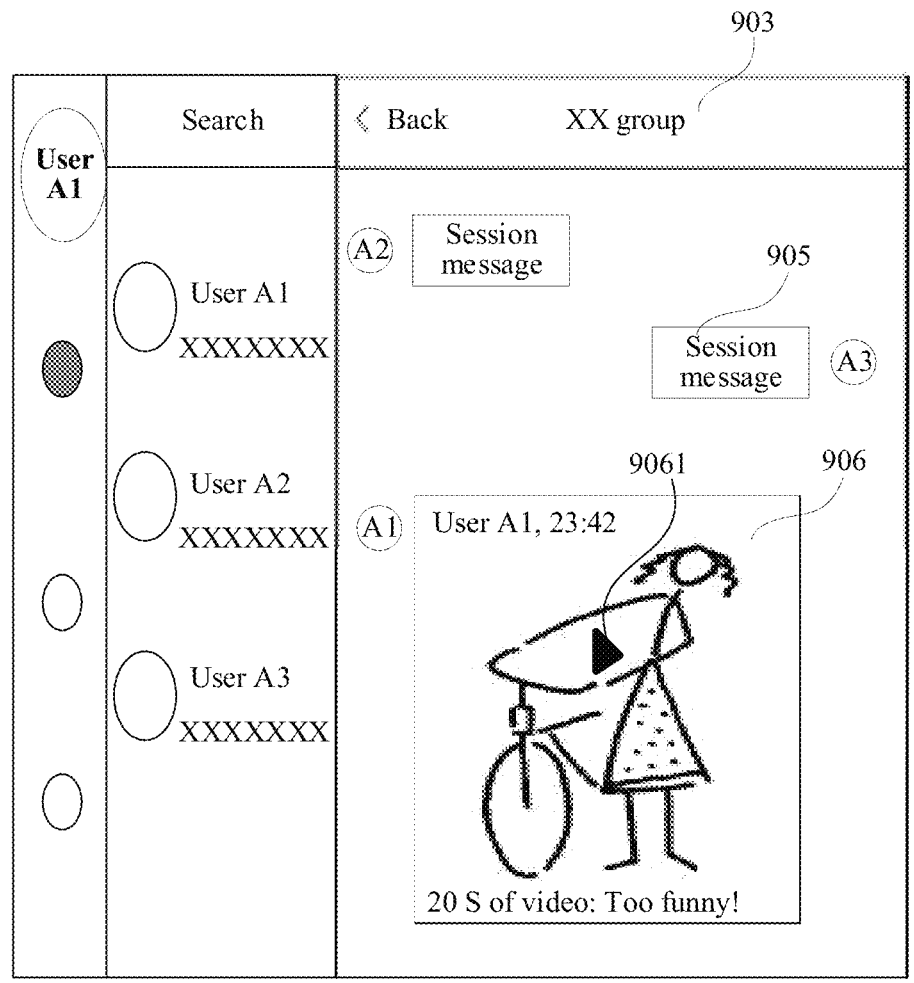

As shown in FIG. 17, the user A3 sends a session message 905 citing the video to the XX group, and the user A3 and the user A1 regard each other as chat objects who have established a session based on the XX group. Accordingly, the XX group in which the user A3 is located is determined as the target chat object.

Therefore, in the session interface 903 in which the target chat object (the XX group) is located, the target frame is used as a starting picture for display, and the comment content "too funny!" of the target frame is displayed.

The target frame is used as the starting picture for display, which means that when the user clicks a video message 906 including a triangular icon 9061, as shown in FIG. 17, the video is played from the target frame, and it may alternatively be understood that a first frame of picture of the video watched by the user is the target frame.

In other embodiments, the target frame cited by the video message is not limited to being displayed in a form of thumbnails, and may alternatively be displayed by means of a playback link, and the like. Correspondingly, for a display mode, the comment content cited by the video message is also not limited to being displayed in a bottom position of the video message, may alternatively be displayed in a top position of the video message, may be superimposed on the top of the video message in a form of a comment/bubble, or even may be displayed separately from the target frame cited by the video message. This is not specifically limited in this embodiment.

In some embodiments, as shown in FIG. 16 to FIG. 17, a playing time point (for example, 20 S of the video) of the target frame in the video, a user identifier A1 corresponding to a user who send the video message, a time 23:42 at which the video message is sent, and the like may alternatively be displayed in the session interface 903.

Accordingly, the user A1 shares the video message citing the target frame to the session interface 903 in which the target chat object (the XX group) is located.

Through the above process, when sharing a video, the user may post comment content for a target frame, thereby ensuring that the comment posted by the user is for a specified picture of the video, to realize accurate conveying of the sharing action of the user.

In addition, based on the automatic extraction of a plurality of frames of picture, the user can avoid relying on a third-party application for video editing, which greatly reduces the complexity of the video sharing process, thereby effectively enhancing the fun of video sharing of the user and improving video sharing experience of the user.

Figure 18:
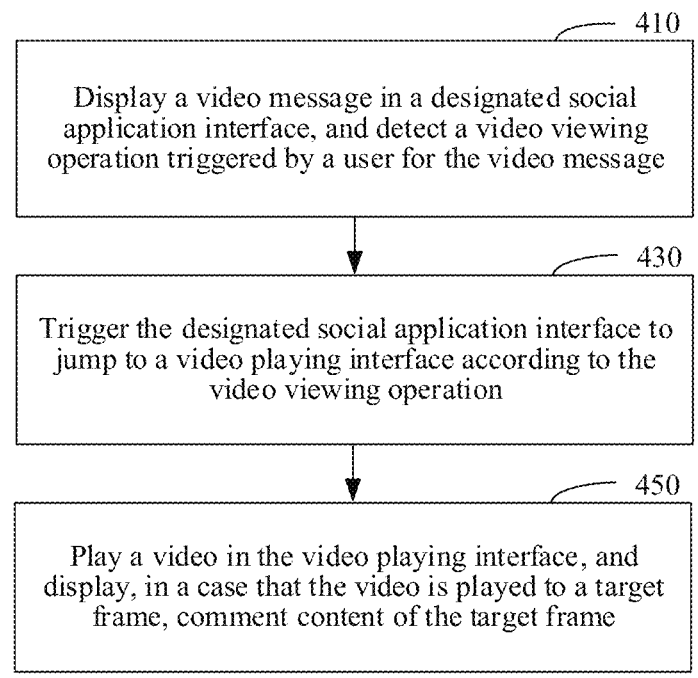
FIG. 18 is a flowchart of a video message generation method according to an embodiment of this application.

Referring to FIG. 18, in an embodiment, the foregoing method may further include the following steps:

Step 410: Display a video message in a designated social application interface, and detect a video viewing operation triggered by a user for the video message.

The video message is generated according to the video message generation method in the foregoing embodiments, and is shared to the designated social application interface.

Step 430: Trigger the designated social application interface to jump to the video playing interface according to the video viewing operation.

Step 450: Play the video in the video playing interface, and display the comment content of the target frame when the video is played to the target frame.

The video is played, which means that the video is played in the video playing interface by using the target frame as a starting picture.

For example, the designated social application interface is the session interface.

Referring to FIG. 17 again, in the session interface 903, when the user performs the video viewing operation on the video message 906 including the triangular icon 9061, the session interface jumps to the video playing interface. In this case, in the video playing interface, the video is played by using the target frame cited by the video message 906 as the starting picture, as shown in FIG. 4, that is, a first frame of picture of the video watched by the user is the target frame.

Figure 19:
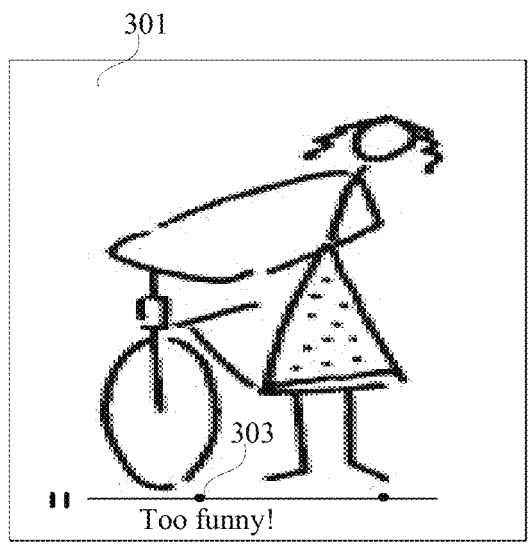
FIG. 19 is a schematic diagram of comment content display involved in the embodiment corresponding to FIG. 18.

In addition, as shown in FIG. 19, as the video is played to the target frame in a video playing interface 301, that is, a playing progress bar of the video reaches a playing time point 303, comment content "too funny!" may be correspondingly displayed in the video playing interface 301, so that the user can view the relevant comments on the target frame in the video while watching the video, thereby achieving a purpose of discussing with another user.

Through the above process, the user shares a video message citing a target frame. Therefore, when another user views the video message shared by the user, he can watch directly from the target frame, thereby accurately comprehending that comment content posted by the user is for the target frame. Accordingly, a problem of inaccurate expression of shared content during video sharing in the related art is effectively solved, and accurate conveying of user sharing actions is fully ensured.

A video is formed by several frames of picture, and any frame of picture in the video may be used as a target frame to participate in sharing of a video message. In other words, for the same video, there may be more than one target frame containing comment content.

As such, to improve video viewing experience of the user, when the video is played in a video playing interface, all the comment content of target frames containing comment content in the video may be displayed in the video playing interface.

The following describes a process of video playback in detail.

Figure 21:
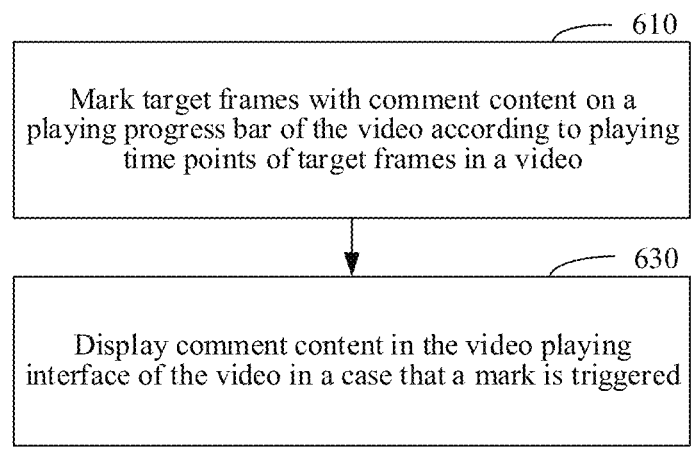
FIG. 21 is a flowchart of a video message generation method according to an embodiment of this application.

Referring to FIG. 21, in an embodiment, after step 370, the method described above may further include the following steps:

Step 610: Mark target frames with the comment content on the playing progress bar of the video according to playing time points of target frames in the video.

Figure 22:
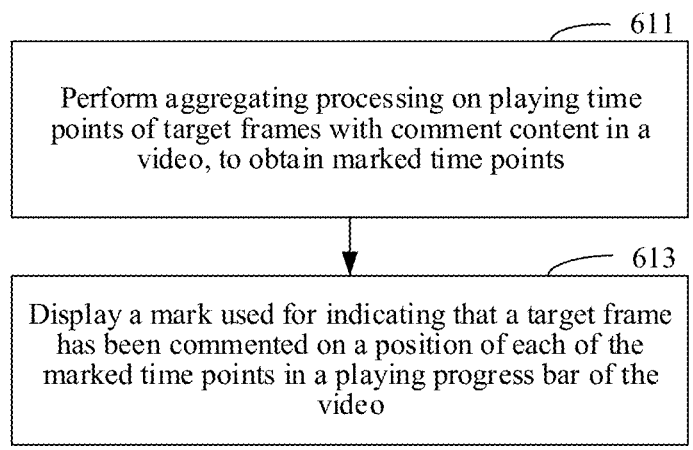
FIG. 22 is a flowchart of an embodiment of step 610 in the embodiment corresponding to FIG. 21.

As shown in FIG. 22, in an implementation of an embodiment, step 610 may include the following steps:

Step 611: Perform aggregating processing on the playing time points of the target frames with the comment content in the video, to obtain marked time points.

Herein, once there are many target frames with comment content in a video, for a video playing progress bar with a limited length, when mark display is performed, it is likely that the marks are too dense, which is not conducive to viewing of the user on the comment content, thereby affecting the video viewing experience of the user.

Therefore, in this embodiment, the aggregating processing refers to aggregation of the playing time points of the target frames with the comment content in the video within 1 S based on a unit of second (S). The aggregation unit 1 S may be flexibly adjusted according to an actual requirement of an application scenario, which is not limited herein.

For example, the playing time points of the target frames with the comment content in the video include 19 S, 20 S, 20.1 S, 20.2 S, 23 S, and the like of the video. Therefore, 20 S, 20.1 S, and 20.2 S of the video are aggregated to the same playing time point: 20 S of the video. Accordingly, finally-obtained marked time points are 19 S, 20 S, and 23 S of the video.

Step 613: Display a mark used for indicating that a target frame has been commented on a position of each of the marked time points in the playing progress bar of the video.

Figure 20:
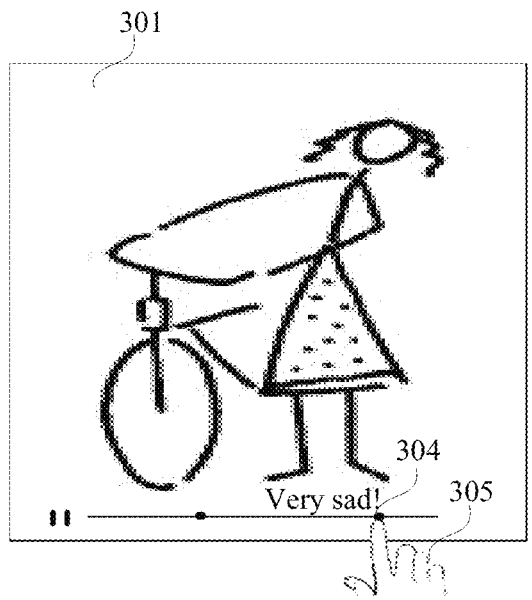
FIG. 20 is a schematic diagram of comment content display according to an embodiment of this application.

As shown in FIG. 20, in the video playing interface 301, a mark 304 corresponds to a position of one of the marked time points in the playing progress bar of the video, and indicates that the target frame has been commented, for example, comment content is "very sad!".

Accordingly, mark display in video playback is realized. Through the displayed mark, the user can conveniently view the comment content related to the target frame while watching the video, for example, perform step 630, thereby effectively improving the video viewing experience of the user.

Step 630: Display the comment content in the video playing interface of the video when the mark is triggered.

That is, still referring to FIG. 20, the user triggers a video viewing operation 305 for the mark 304 in the video playing interface 301, and the comment content "very sad!" may be correspondingly displayed in the video playing interface 301, so that the user can view the relevant comments on the target frame in the video while watching the video, thereby achieving the purpose of discussing with another user.

Similar to the other various operations triggered by the user, the video viewing operation may have different specific actions according to different input components configured in the electronic device, for example, gesture operations such clicking a mark inputted by a touch layer of a smartphone, or mechanical operations such as staying on the mark inputted by a mouse provided in a desktop computer. This is not limited herein.

As mentioned above, the marked time point may be formed by aggregation of a plurality of playing time points. Correspondingly, marks displayed in the video playing interface correspond to the playing time points of a plurality of target frames in the video. It is also to be understood that, there are a plurality of target frames associated with the marks. In view of this, when comment content is displayed, all the comment content of the plurality of target frames associated with the marks may be displayed in the video playing interface at the same time. For example, all comment content of the plurality of target frames associated with the marks is displayed in a bullet screen form.

In an embodiment, when the mark is triggered, the video is played from the target frame associated with the mark in the video playing interface.

That is, when the mark is triggered, the user may not only view the comment content of the target frame, but playback progress of the video being watched jumps to the target frame, so that the comment content is accurately mapped to the target frame, thereby fully reflecting the accurate conveying of shared content of the user.

In addition, in an embodiment, before step 630, the method described above may further include the following step:

Obtain comment content that will be displayed.

The comment content of the target frame cited by the video message is often stored on a server side. When the video is played, the electronic device obtains the comment content from the server side, which may cause delays due to network data transmission and other reasons to result in frozen video playback, thereby affecting the video viewing experience of the user.

Therefore, in this embodiment, a pre-pulling solution is adopted to achieve acquisition of comment content. The pre-pulling solution refers to constructing a comment index table in a memory of an electronic device, and caching, before a video is played, comment content of target frames with the comment content in the video obtained from a server side.

Therefore, during video playback, obtaining of the comment content that will be displayed is essentially to read from the comment index table constructed in the memory of the electronic device. The comment index table establishes a corresponding relationship between indexes and index information. The indexes are playing time points of target frame with the comment content in the video, and the index information is the comment content of the target frames.

Accordingly, based on the corresponding relationship established in the comment index table, the corresponding index information, namely, the comment content of the target frame with the comment content in the video, may be obtained from the index.

Figure 23:
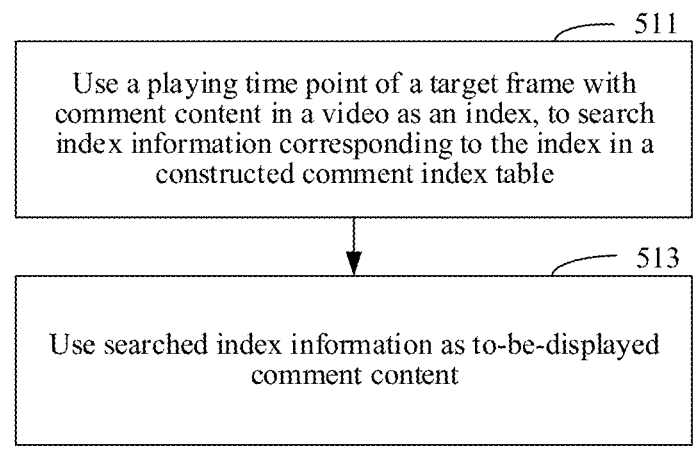
FIG. 23 is a flowchart of a method for obtaining comment content according to an embodiment of this application.

As shown in FIG. 23, in an implementation of an embodiment, a process of obtaining the comment content may include the following steps:

Step 511: Use the playing time point of a target frame with the comment content in the video as an index, and search a constructed comment index table for index information corresponding to the index.

Step 513: Use founded index information as comment content that will be displayed.

Through such configuration, the pre-pulling solution of the comment content based on the comment index table is realized, which helps to avoid a frozen situation that appears during video playback because of delay caused by network data transmission and other reasons, and fully protects smooth experience of the user when watching the video.

The following describes a process of constructing a comment index table in detail.

Figure 24:
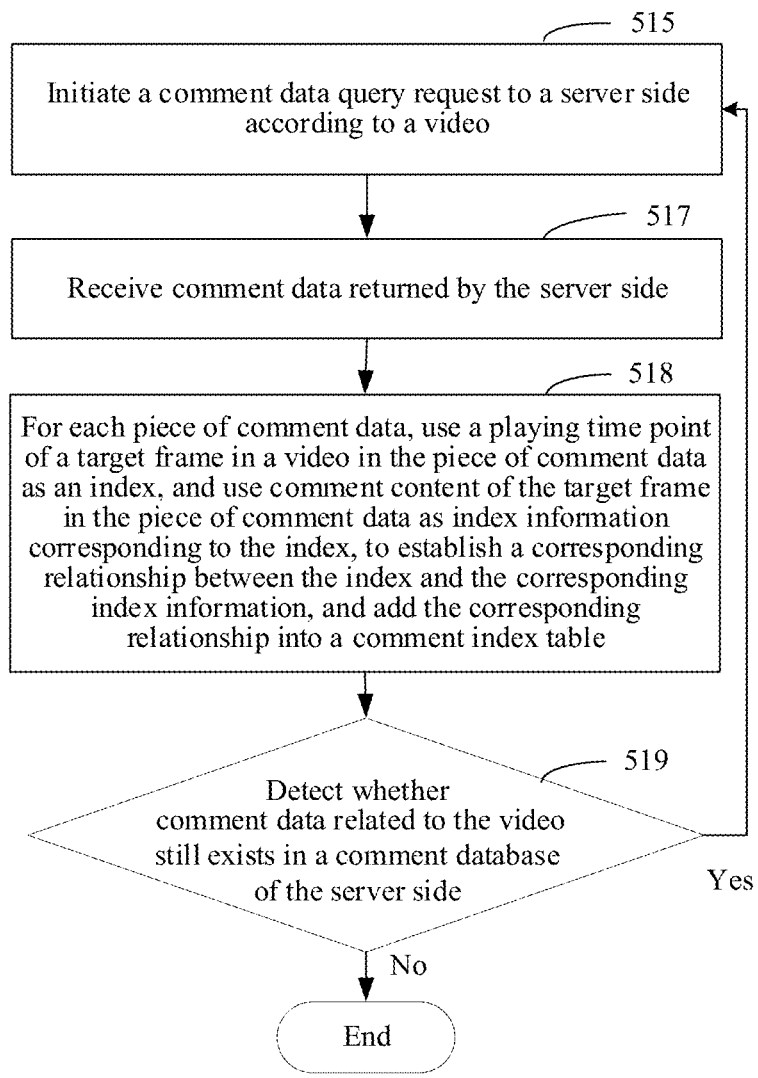
FIG. 24 is a flowchart of a comment data pre-pulling solution involved in the embodiment corresponding to FIG. 23.
Figure 25:
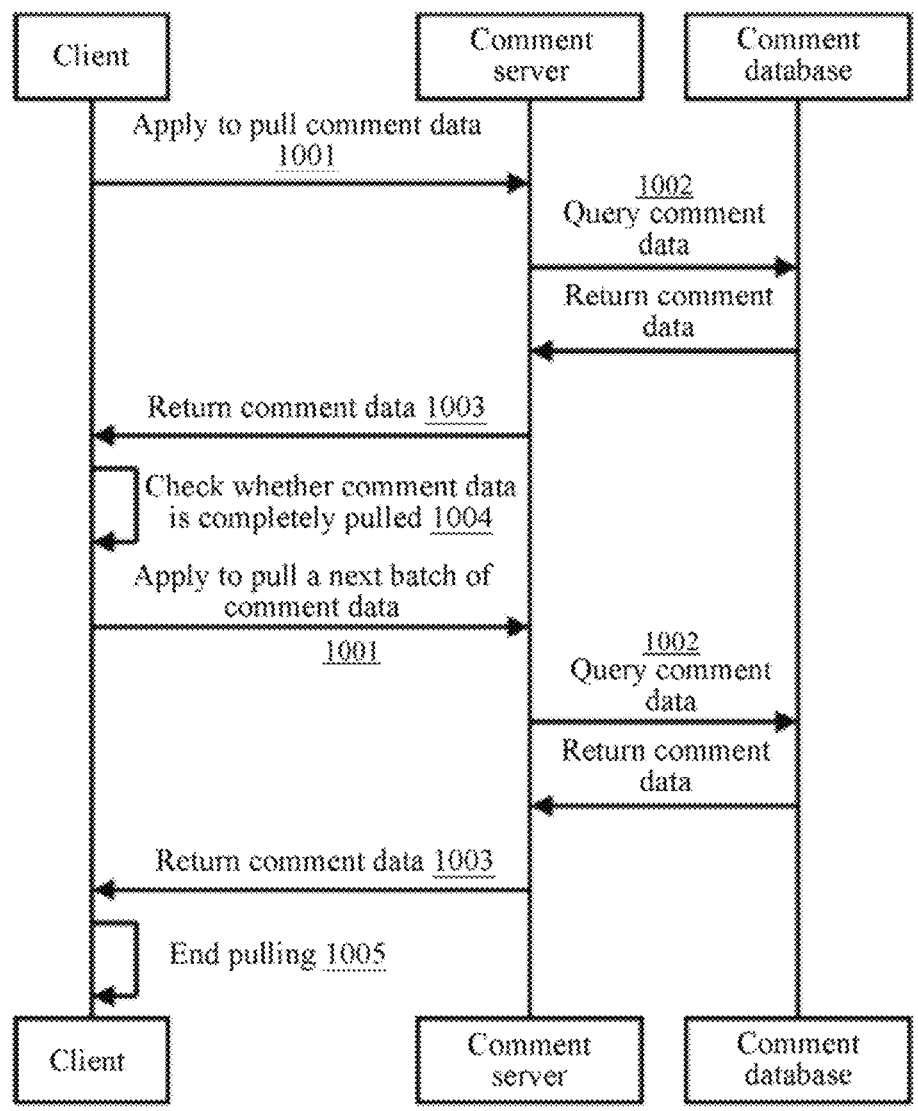
FIG. 25 is a sequence diagram of the comment data pre-pulling solution involved in the embodiment corresponding to FIG. 23.

Referring to FIG. 24 to FIG. 25, in an embodiment, before step 511, the method described above may further include the following steps:

Step 515: A client initiates a comment data query request to a server side according to the video.

The comment data query request is used for indicating the server side to query a designated quantity of comment data in a comment database, and the comment data includes comment content of target frames with the comment content in the video.

Referring to FIG. 25, in some embodiments, the client performs step 1001 of applying for a comment server to pull the comment data, so that the comment server performs step 1002 of requesting to query the comment data for the comment database. After the comment database performs a corresponding query operation, the comment data is returned, and then the comment server performs step 1003 of returning queried comment data to the client.

Step 517: Receive the comment data returned by the server side.

Step 518: For each piece of comment data, use a playing time point of a target frame in the video in the piece of comment data as an index, and use comment content of the target frame in the piece of comment data as index information corresponding to the index, to establish a corresponding relationship between the index and the corresponding index information, and add the corresponding relationship into the comment index table.

Step 519: Detect whether comment data related to the video still exists in the comment database of the server side.

If the comment data related to the video does not exist in the comment database of the server side, end obtaining the comment data.

If the comment data related to the video still exists in the comment database of the server side, return to step 515 of the initiating a comment data query request to a server side according to the video, to continue obtaining the comment data until the server side returns all comment data related to the video.

Still referring to FIG. 25, after the comment server performs step 1003 of returning the comment data to the client, the client performs step 1004 of checking whether all relevant comment data has been pulled, and if the comment data related to the video still exists in the comment database, continues to perform step 1001 of applying to pull a next batch of comment data. Correspondingly, the comment server performs step 1002 of requesting the comment database to query the related comment data and returning the queried comment data, so that the comment server performs step 1003 and returns the comment data, The operations of steps 1001 to 1003 are cyclically executed until step 1005 of pulling ends.

Herein, even if the pre-pulling solution is adopted, if amount of comment data is large, the server side returns all the comment data at a time. It is also to be understood that, when the electronic device pre-pulls all the comment data from the server side at a time, it is still possible that due to a long network data transmission time, the user cannot obtain the comment data for display for a long time, thereby affecting the video viewing experience of the user.

In view of this, in this embodiment, the pre-pulling solution is adopted many times to obtain the comment data, that is, the electronic device requests a designated quantity of comment data. Correspondingly, the server side returns the designated quantity of comment data until the server side returns an entire quantity of comment data, and the electronic device stops initiating the comment data query request. The designated quantity may be flexibly adjusted according to an actual requirement of an application scenario, which is not limited herein.

Accordingly, by controlling the quantity of each pre-pulling comment data, a quantity of a single pre-pulling comment data is reduced, thereby reducing time for the single pre-pulling comment data, and ensuring that user can view comment data related to the video while watching the video, to improve the video viewing experience of the user based on pre-pulling.

Figure 26:
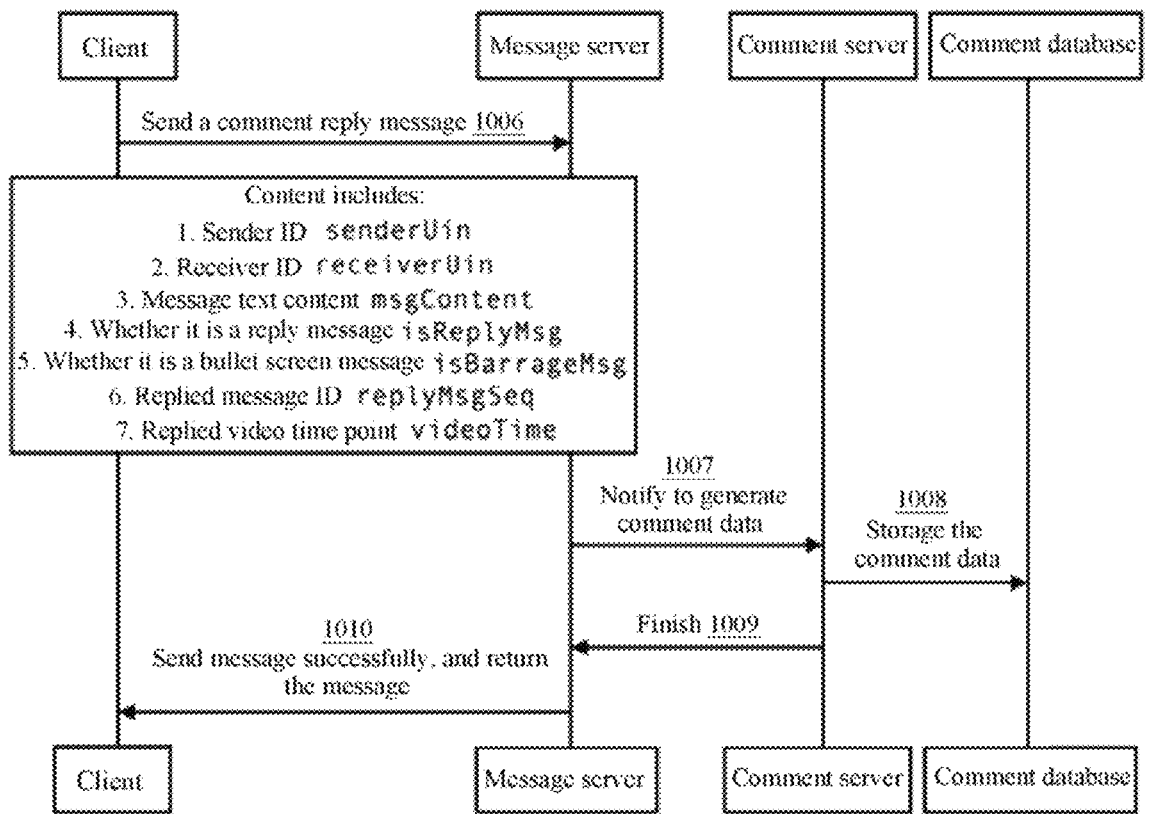
FIG. 26 is a sequence diagram of comment database construction involved in the embodiment corresponding to FIG. 23.

The construction of the comment database is shown in FIG. 26.

In some embodiments, when the user posts comment content for a target frame, the electronic device may send a reply message 1006 to a message server accordingly. A content of the reply message 1006 at least includes: comment content (msgContent), whether to be the comment content (isReplyMsg), a playing time point (videoTime) of the target frame in which the comment content is located in the video.

In step 1006, the client sends a comment reply message to the message server. After receiving the reply message, the message server performs step 1007 of notifying to generate comment data, to request the comment server to generate comment data related to the video. The comment server performs step 1008 of storing the generated comment data in the comment database for subsequent query of comment data related to the video. After finishing storing the comment data, the comment server performs step 1009 of notifying the message server that the generation of the comment data has been finished, and then the message server performs step 1010 of notifying the client that the message has been sent successfully.

Accordingly, based on the constructed comment database, relevant comment data can be queried for the video.

In some embodiments, the comment database may be constructed on the comment server, or may be independent of the comment server and constructed on another server. Alternatively, the message server, the comment server, and the comment database belong to the same server cluster, so that the same server cluster may better provide users with video sharing services. These are not limited herein.

In an embodiment, the method described above may further include the following step:

Receive a hiding instruction, and perform hiding processing on a mark displayed in the video playing interface for playing the video according to the hiding instruction, the mark being used for indicating that the target frames have been commented.

Figure 27:
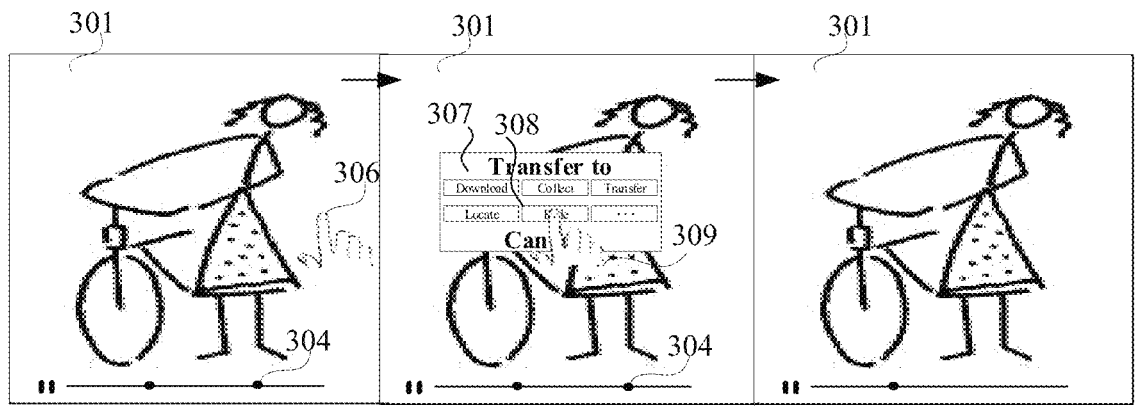
FIG. 27 is a schematic diagram of mark hiding according to an embodiment of this application.

As shown in FIG. 27, by detecting the trigger operation 304 of the user, a dialog box 307 is displayed in the video playing interface 301. In some embodiments, when the user performs a trigger operation 309 on a "hide" icon 308 in the dialog box 307, the electronic device is deemed to have received the hiding instruction. Correspondingly, the mark 304 displayed in the video playing interface 301 is changed from a displayed state to a hidden state.

Accordingly, during the video playback process, the marks are no longer displayed in the video playing interface.

Through this configuration, free switching of a mark from a displayed state to a hidden state is realized. Therefore, only a user who intends to view comment content related to a video can view the comment content based on marks displayed in a video playing interface. Based on hidden marks in the video playing interface, a user who does not intend to view the comment content related to the video is completely unaware when watching the video. Accordingly, application scenarios of the video playback method are effectively expanded, thereby helping to improve the video viewing experience of the user.

Apparatus embodiments of this application are described below, and may be used for performing the video message generation method involved in this application. For details not disclosed in the apparatus embodiment of this application, refer to the method embodiment of the video message generation method involved in this application.

Figure 28:
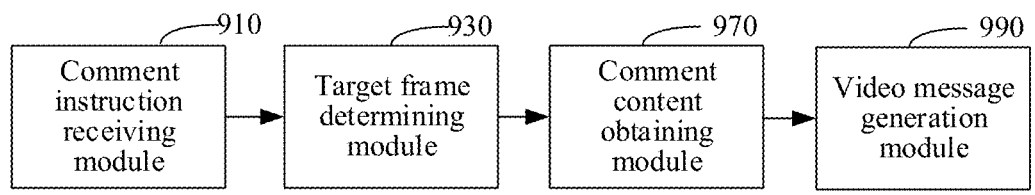
FIG. 28 is a block diagram of a video message generation apparatus according to an embodiment of this application.

Referring to FIG. 28, in an embodiment, a video message generation apparatus 900 includes, but is not limited to: a comment instruction receiving module 910, a target frame determining module 930, a comment content obtaining module 970, and a video message generation module 990.

The comment instruction receiving module 910 is configured to receive a comment instruction for a video.

The target frame determining module 930 is configured to determine a target frame corresponding to the comment instruction in the video in response to the comment instruction.

The comment content obtaining module 970 is configured to obtain input comment content inputted of the target frame.

The video message generation module 990 is configured to generate a video message based on the video, the target frame, and the comment content of the target frame.

When the apparatus provided in the foregoing embodiment performs the generation of the video message, only divisions of the foregoing functional modules are described by using an example. During actual application, the foregoing functions may be allocated to and completed by different functional modules according to requirements, that is, the internal structure of the video message generation apparatus is divided into different functional modules, to complete all or some of the foregoing described functions.

In addition, the video message generation apparatus provided in the foregoing embodiment and the embodiments of the video message generation method belong to a design. Specific operations of the modules correspond to related descriptions, such as the descriptions in the method embodiment.

Figure 29:
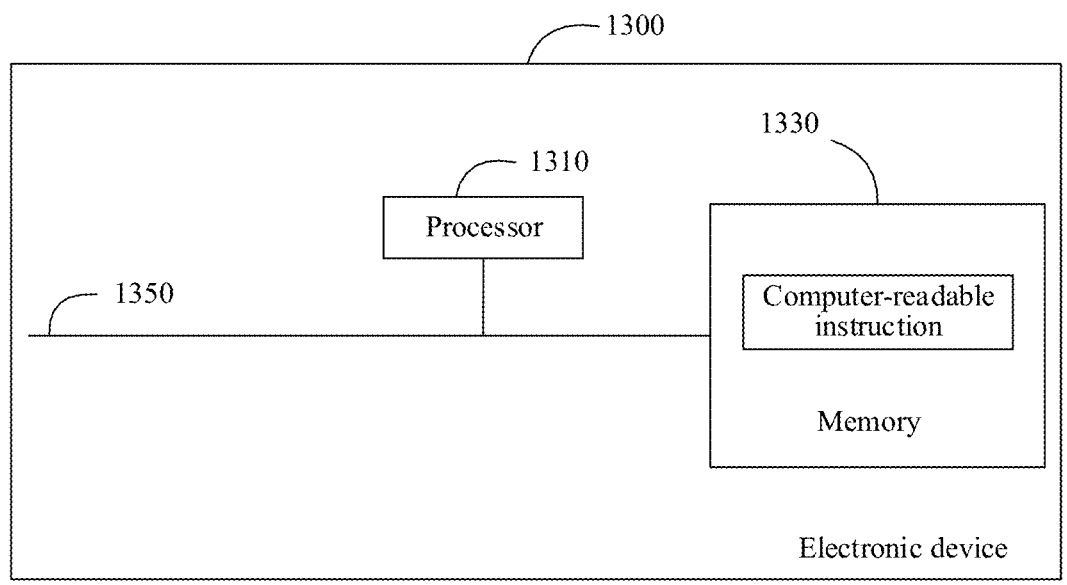
FIG. 29 is a block diagram of an electronic device according to an embodiment of this application.

Referring to FIG. 29, in an embodiment, an electronic device 1300 is provided, including at least one processor 1310, at least one memory 1330 and at least one communication bus 1350.

The memory 1330 stores computer-readable instructions, and the processor 1310 reads, by using the communication bus 1350, the computer-readable instructions stored in the memory 1330.

The computer-readable instructions, when executed by the processor 1310, implement the video message generation method in the foregoing embodiments.

An embodiment of this application further provides a storage medium, storing a computer program, where steps of the video message generation method in the foregoing embodiments are implemented when the program is executed by a processor.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

The foregoing descriptions are merely embodiments of this application, and are not intended to limit the implementations of this application. A person of ordinary skill in the art may conveniently make variations or modifications according to the main idea and spirit of this application. Therefore, the protection scope of this application shall be subject to the protection scope of the claims.

INDUSTRIAL APPLICABILITY

An electronic device in the embodiments of this application receives a comment instruction for a video; determines a target frame corresponding to the comment instruction in the video in response to the comment instruction; obtains input comment content of the target frame; and generates a video message based on the video, the target frame, and the comment content of the target frame. Accordingly, a video message that will be shared is not only related to the target frame corresponding to the comment instruction in the video, but also is related to the comment content of the target frame. When viewing the video message shared by the user, another user can understand that the comment content posted by the user is for the target frame, which ensures expression accuracy of the shared content when the video is shared.

What is claimed is:

1. A video message generation method, performed by an electronic device, the method comprising:
receiving a comment instruction for a video being played in a video playing region;

determining a target frame corresponding to the comment instruction in the video;
obtaining a user's input comment contents of a plurality of the target frames;
generating a video message based on the video, the plurality of the target frames, and the user's input comment contents of the plurality of the target frames;
sharing the video message in a session interface of a social application; and
displaying the video message in the session interface of the social application, the video message comprising the video, the plurality of the target frames with corresponding playing time points, and the user's input comment contents of the plurality of the target frames, wherein the video message enables playing the video starting from one of the plurality of the target frames with corresponding comment content, and the target frame is not a first frame of the video,
wherein the determining the target frame corresponding to the comment instruction in the video further includes:
in response to the comment instruction, automatically displaying, in a designated region of a video playing interface different from the video playing region, a plurality of thumbnails representing a plurality of frames of the video as candidates to be selected as the target frame by the user.

2. The method according to claim 1, wherein the receiving a comment instruction for a video comprises:
detecting a picture commenting operation in a video playing interface in which the video is played; and
using the detected picture commenting operation as the comment instruction.

3. The method according to claim 1, wherein:
the plurality of frames include all or certain key frames of the video.

4. The method according to claim 1, wherein the determining a target frame corresponding to the comment instruction in the video further comprises:
detecting, among the plurality of thumbnails, a selection operation triggered by the user on the displayed thumbnails; and
using at least one frame corresponding to any thumbnail selected by the selection operation as the target frame.

5. The method according to claim 1, wherein after the receiving a comment instruction for a video, the method further comprises:
playing the video and displaying a playing progress bar of the video in the video playing region of the video playing interface.

6. The method according to claim 1, wherein:
the plurality of frames corresponding to the plurality of thumbnails are determined using a picture currently played in the video playing region.

7. The method according to claim 1, wherein the obtaining input comment content of the target frame comprises:
initiating a window for the target frame;
displaying the window in the video playing interface in which the video is played; and
obtaining the comment content of the target frame according to a triggered comment input operation in a content input region of the window.

8. The method according to claim 1, wherein after the sharing the video message in a session interface of a social application, the method further comprises:
detecting a video viewing operation on the video message in the session interface; and
playing the video in the video playing interface according to the video viewing operation, and displaying the comment content of the target frame when the video is played to the target frame.

9. The method according to claim 1, further comprising:
detecting a video viewing operation on the video message in the session interface; and
playing the video by using the target frame as a starting picture in the video playing interface, and displaying the comment content of the target frame.

10. The method according to claim 1, wherein comment contents of a plurality of target frames are obtained, and the method further comprises:
marking the target frames with the comment contents on the playing progress bar of the video according to playing time points of the target frames in the video; and
when one of the marks is triggered, displaying the comment content corresponding to the triggered mark in the video playing interface of the video.

11. The method according to claim 10, wherein the method further comprises:
using the playing time point of the target frame with the comment content in the video as an index, and searching a constructed comment index table for index information corresponding to the index; and
using founded index information as the comment content to be displayed.

12. The method according to claim 1, wherein the session interface of the social application is a message conversation interface corresponding to one or more chat objects determined based on user selection.

13. The method according to claim 1, wherein comment contents of a plurality of target frames are obtained, and the method further comprises:
displaying the plurality of target frames with the corresponding comment contents;
receiving selection of one of the plurality of target frames; and
playing the video starting from the selected target frame with the corresponding comment content.

14. A video message generation apparatus, comprising:
at least one processor; and
at least one memory, the memory storing computer-readable instructions, and the computer-readable instructions, when executed by the at least one processor, cause the at least one processor to:
receive a comment instruction for a video being played in a video playing region;
determine a target frame corresponding to the comment instruction in the video;
obtain a user's input comment contents of a plurality of the target frames;
generate a video message based on the video, the plurality of the target frames, and the user's input comment contents of the plurality of the target frames;
share the video message in a session interface of a social application; and
display the video message in the session interface of the social application, the video message comprising the video, the plurality of the target frames with corresponding playing time points, and the user's input comment contents of the plurality of the target frames, wherein the video message enables playing the video starting from one of the plurality of the target frames with corresponding comment content, and the target frame is not a first frame of the video, wherein the determining the target frame corresponding to the comment instruction in the video further includes:

in response to the comment instruction, automatically displaying, in a designated region of a video playing interface different from the video playing region, a plurality of thumbnails representing a plurality of frames of the video as candidates to be selected as the target frame by the user.

15. A non-transitory computer readable storage medium, storing a computer program, the computer program, when executed by at least one processor, causing the at least one processor to implement:

receiving a comment instruction for a video being played in a video playing region;

determining a target frame corresponding to the comment instruction in the video;

obtaining a user's input comment contents of a plurality of the target frames;

generating a video message based on the video, the plurality of the target frames, and the user's input comment contents of the plurality of the target frames;

sharing the video message in a session interface of a social application; and displaying the video message in the session interface of the social application, the video message comprising the video, the plurality of the target frames with corresponding playing time points, and the user's input comment contents of the plurality of the target frames, wherein the video message enables playing the video starting from one of the plurality of the target frames with corresponding comment content, and the target frame is not a first frame of the video, wherein the determining the target frame corresponding to the comment instruction in the video further includes:

in response to the comment instruction, automatically displaying, in a designated region of a video playing interface different from the video playing region, a plurality of thumbnails representing a plurality of frames of the video as candidates to be selected as the target frame by the user.

16. The computer readable storage medium according to claim 15, wherein the receiving a comment instruction for a video comprises:

detecting a picture commenting operation in a video playing interface in which the video is played; and using the detected picture commenting operation as the comment instruction.

17. The computer readable storage medium according to claim 15, wherein the computer program further cause the at least one processor to implement:

playing the video and displaying a playing progress bar of the video in the video playing region of the video playing interface.

18. The computer readable storage medium according to claim 15, wherein the determining a target frame corresponding to the comment instruction in the video further comprises:

detecting, among the plurality of thumbnails, a selection operation triggered by the user on the displayed thumbnails; and using at least one frame corresponding to any thumbnail selected by the selection operation as the target frame.

19. The computer readable storage medium according to claim 15, wherein:

the plurality of frames corresponding to the plurality of thumbnails are determined using a picture currently played in the video playing region.

20. The computer readable storage medium according to claim 15, wherein the obtaining input comment content of the target frame comprises:

initiating a window for the target frame;

displaying the window in the video playing interface in which the video is played; and obtaining the comment content of the target frame according to a triggered comment input operation in a content input region of the window.

* * * * *